(12) United States Patent
Kitano et al.

(10) Patent No.: US 10,751,668 B2
(45) Date of Patent: Aug. 25, 2020

(54) METHOD OF FORMING REVERSE OSMOSIS MEMBRANE

(71) Applicants: KITAGAWA INDUSTRIES CO., LTD., Aichi (JP); SHINSHU UNIVERSITY, Nagano (JP)

(72) Inventors: Hiroki Kitano, Kasugai (JP); Akio Yamaguchi, Kasugai (JP); Morinobu Endo, Nagano (JP); Josue Ortiz Medina, Nagano (JP)

(73) Assignees: KITAGAWA INDUSTRIES CO., LTD., Aichi (JP); SHINSHU UNIVERSITY, Nagano (JP)

( * ) Notice: Subject to any disclaimer, the term of this patent is extended or adjusted under 35 U.S.C. 154(b) by 291 days.

(21) Appl. No.: 15/745,766

(22) PCT Filed: Jul. 28, 2016

(86) PCT No.: PCT/JP2016/072161
§ 371 (c)(1),
(2) Date: Jan. 18, 2018

(87) PCT Pub. No.: WO2017/018482
PCT Pub. Date: Feb. 2, 2017

(65) Prior Publication Data
US 2018/0193799 A1     Jul. 12, 2018

(30) Foreign Application Priority Data

| Jul. 28, 2015 | (JP) | ................................. 2015-148605 |
| Oct. 2, 2015 | (JP) | ................................. 2015-196457 |
| Mar. 10, 2016 | (JP) | ................................. 2016-047293 |

(51) Int. Cl.
*B01D 67/00* (2006.01)
*B01D 69/10* (2006.01)
(Continued)

(52) U.S. Cl.
CPC ....... *B01D 67/0072* (2013.01); *B01D 61/025* (2013.01); *B01D 69/10* (2013.01);
(Continued)

(58) Field of Classification Search
CPC .............. B01D 61/025; B01D 67/0072; B01D 71/021; B01D 69/10; B01D 69/12; B01D 53/228
See application file for complete search history.

(56) References Cited

U.S. PATENT DOCUMENTS 5,049,167 A * 9/1991 Castro .................. B01D 69/125
                                                      95/55
6,388,366 B1    5/2002 Pryor
(Continued)

FOREIGN PATENT DOCUMENTS

| JP | 11-504753 | 4/1999 |
| JP | 2011-159338 | 8/2011 |

(Continued)

OTHER PUBLICATIONS

English translation of Japanese Patent Application No. 2012-036061 A (2012).*
(Continued)

*Primary Examiner* — John Kim
(74) *Attorney, Agent, or Firm* — Wenderoth, Lind & Ponack, L.L.P.

(57) ABSTRACT

A method of forming a reverse osmosis membrane 1 of the present invention includes a coating membrane forming step of forming a coating membrane which is soluble in a predetermined solvent on a surface of a porous support substrate 2 that is insoluble in the solvent, a carbon membrane forming step of forming a carbon membrane 3 on the coating membrane by a physical vapor deposition which deposits carbon as a target material under an atmosphere where rare gas and nitrogen gas are contained, and a
(Continued)

removing-by-dissolving step of removing the coating membrane by dissolving the same in the solvent after formation of the carbon membrane 3.

12 Claims, 36 Drawing Sheets

(51) Int. Cl.
*B01D 69/12* (2006.01)
*B01D 61/02* (2006.01)
*B01D 71/02* (2006.01)
*B01D 53/22* (2006.01)

(52) U.S. Cl.
CPC .......... *B01D 69/12* (2013.01); *B01D 71/021* (2013.01); *B01D 53/228* (2013.01)

(56) References Cited

U.S. PATENT DOCUMENTS

| | | | |
|---|---|---|---|
| 8,147,596 | B2 | 4/2012 | Fukui |
| 2010/0083836 | A1 | 4/2010 | Fukui |
| 2017/0001153 | A1 | 1/2017 | Ichinose et al. |

FOREIGN PATENT DOCUMENTS

| | | |
|---|---|---|
| JP | 2012-036061 | 2/2012 |
| JP | 5527662 | 6/2014 |
| WO | 2008/081855 | 7/2008 |
| WO | 2015/080259 | 6/2015 |

OTHER PUBLICATIONS

Kimura et al., "Formation of amorphous carbon nitride films by reactive $Ar/N_2$ high-power impulse magnetron sputtering", Japanese Journal of Applied Physics, vol. 54, No. 1S, 2015.

Kimura et al., "Formation of hydrogenated diamond-like carbon films by reactive $Ar/CH_4$ high-power impulse magnetron sputtering", Japanese Journal of Applied Physics, vol. 53, No. 9, 2014.

Ortiz-Medina et al., "Nanostructured carbon-based membranes: nitrogen doping effects on reverse osmosis performance", NPG Asia Materials, vol. 8, No. 4, 2016.

International Search Report dated Sep. 6, 2016 in International (PCT) Application No. PCT/JP2016/072161.

International Preliminary Report on Patentability dated Sep. 5, 2017 in International (PCT) Application No. PCT/JP2016/072161, with partial translation.

Written Opinion of the International Searching Authority dated Sep. 6, 2016 in International (PCT) Application No. PCT/JP2016/072161, with partial translation.

* cited by examiner

EXAMPLE 1

EXAMPLE 1

EXAMPLE 2

EXAMPLE 2

COMPARATIVE EXAMPLE 1

COMPARATIVE EXAMPLE 1

COMPARATIVE EXAMPLE 2

EXAMPLE 1

EXAMPLE 2

COMPARATIVE EXAMPLE 1

COMPARATIVE EXAMPLE 2

FIG.33
38.1°
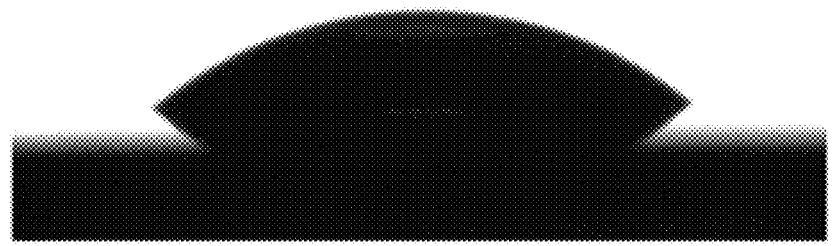
EXAMPLE 1
FIG.34
45.8°
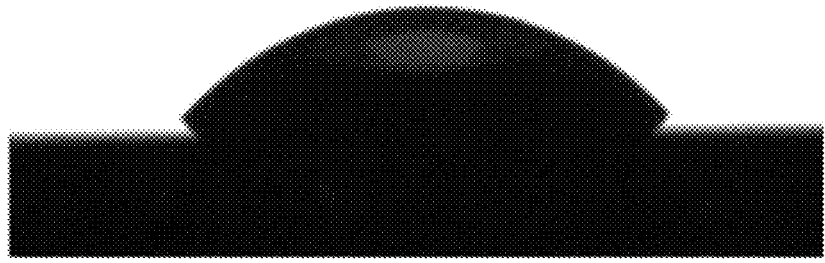
EXAMPLE 2

Ar 68.8°

COMPARATIVE EXAMPLE 1

Ar:CH₄

46.9°

COMPARATIVE EXAMPLE 2

METHOD OF FORMING REVERSE OSMOSIS MEMBRANE

TECHNICAL FIELD

The present invention relates to a method of forming a reverse osmosis membrane.

BACKGROUND ART

It is attempted to use a porous carbon membrane as an active layer in a filtration membrane. The porous carbon membrane has superior durability and the like to those of, for example, polymer membranes such as polyamide based membranes, which were the conventional mainstream as the active layer. In recent years, practical use of the porous carbon membrane is expected.

For example, Patent Document 1 discloses that a porous carbon membrane formed by a plasma chemical vapor deposition (CVD) is used as the active layer, in which hydrocarbon gas such as acetylene is used as a carbon source. The porous carbon membrane has a plurality of pores of about several nanometers, the pores being provided through the porous carbon membrane in the thickness direction. For example, in a filtration experiment using a sodium chloride aqueous solution, the impermeable rate for sodium chloride (the concentration: 34 mM) is 68.5%, and the permeable rate (flux) therefor is 4.7 L/h·m$^2$.

Patent Document 1: Japanese Patent Publication No. 5527662

Problem to be Solved by the Invention

The above-mentioned porous carbon membrane is a so-called ultrafiltration membrane for sieving materials according to their size with respect to the pore diameter of the carbon membrane. Accordingly, through a filtration membrane for which such a porous carbon membrane is used, the permeable rate is remarkably decreased as the pore diameter becomes smaller, as apparent from the Hagen-Poiseuille's law. In addition, probability that an object targeted for removal passes through pores is increased as the pore diameter of a porous carbon membrane becomes larger.

According to such a porous carbon membrane as an ultrafiltration membrane, it has been theoretically difficult to balance improvement of the impermeable rate with improvement of the permeable rate.

DISCLOSURE OF THE PRESENT INVENTION

As a result of intensive studies made to solve the above-mentioned problems, the inventors have found out that a carbon membrane formed by a physical vapor deposition that deposits carbon as a target material under an atmosphere where rare gas and nitrogen gas are contained serves as a reverse osmosis membrane which can be diffusely permeated with a particular material contained in a solution and which can also separate the particular material as an object targeted for removal. Consequently, the inventors have completed the present invention.

For example, when the carbon membrane according to the present invention is used to filter a sodium chloride aqueous solution, water molecules can be taken into the carbon membrane, as if the water molecules dissolve in the carbon membrane, and diffusely travel through the carbon membrane. In contrast, a sodium ion or chloride ion in the aqueous solution involves at least two or more water molecules in a cluster state, preventing itself from entering the carbon membrane.

Means for Solving the Problem

Means for solving the above-mentioned problem is as follows.

<1> A method of forming a reverse osmosis membrane, which may include a coating membrane forming step of forming a coating membrane which is soluble in a predetermined solvent on a surface of a porous support substrate that is insoluble in the solvent, a carbon membrane forming step of forming a carbon membrane on the coating membrane by a physical vapor deposition that deposits carbon as a target material under an atmosphere where rare gas and nitrogen gas are contained, and a removing-by-dissolving step of removing the coating membrane by dissolving the same in the solvent after formation of the carbon membrane.

<2> The method of forming a reverse osmosis membrane of above-mentioned <1>, in which the carbon membrane may be formed under an atmosphere where hydrocarbon gas is further contained, in addition to the rare gas and the nitrogen gas, in the carbon membrane forming step.

<3> The method of forming a reverse osmosis membrane of above-mentioned <2>, in which the hydrocarbon gas may consist of methane gas.

<4> The method of forming a reverse osmosis membrane of any one of above-mentioned <1> to <3>, in which the solvent may consist of water and/or alcohol, and the coating membrane may be removed by dissolving the same in the water and/or alcohol in the removing-by-dissolving step.

<5> The method of forming a reverse osmosis membrane of any one of above-mentioned <1> to <4>, in which the porous support substrate may include a nonwoven fabric-type backing layer and a porous plastic layer provided on the backing layer, and the coating membrane may be formed on the porous plastic layer of the porous support substrate in the coating membrane forming step.

Advantageous Effect of the Invention

According to the present invention, it is possible to provide a reverse osmosis membrane which can be diffusely permeated with a particular material in a solution, while separating the particular material as an object targeted for removal.

BRIEF DESCRIPTION OF THE DRAWINGS

FIG. 33 is a view showing a result of contact angle on the carbon membrane of EXAMPLE 1;

FIG. 34 is a view showing a result of contact angle on the carbon membrane of EXAMPLE 2;

BEST MODE FOR CARRYING OUT THE INVENTION

A description is made of a method of forming a reverse osmosis membrane according to one embodiment of the present invention. First, a description is made of a reverse osmosis membrane produced by the forming method of this embodiment.

<Reverse Osmosis Membrane>

Figure 1:
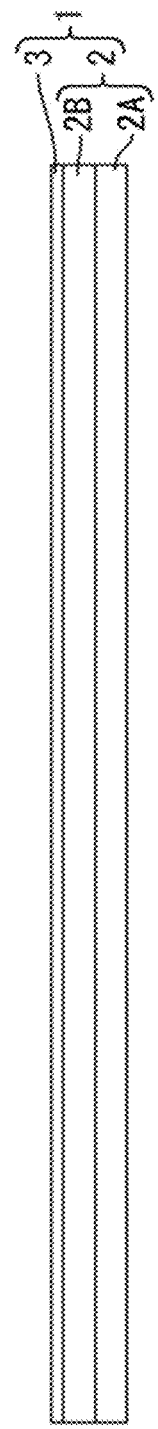
FIG. 1 is an illustration schematically showing the cross-sectional structure of a reverse osmosis membrane.

FIG. 1 is an illustration schematically showing the cross-sectional structure of a reverse osmosis membrane 1. The reverse osmosis membrane 1 includes a porous support substrate 2 and a carbon membrane 3 to be formed on the surface of the porous support substrate 2 as an active layer.

By filtering a solution targeted for filtration, the reverse osmosis membrane 1 can separate a particular material contained in the solution from the solution. For example, in a case where the solution targeted for filtration is salt water, by filtering the salt water (sodium chloride aqueous solution), the reverse osmosis membrane 1 can take out pure water from the salt water while removing salt (NaCl). For this, it is supposed that water molecules in the saltwater can be taken into the carbon membrane serving as an active layer, as if the water molecules dissolve in the carbon membrane, and can diffusely travel through the carbon membrane. Furthermore, it is supposed that a sodium ion or chloride ion in the salt water involves at least two or more water molecules in a cluster state, preventing itself from entering the carbon membrane.

<Porous Support Substrate>

The porous support substrate 2 is a porous member for supporting the carbon membrane 3, and is formed into a sheet. As the porous support substrate 2, a so-called nanofiltration membrane (NF membrane) or ultrafiltration membrane (UF membrane) may be used. The pure water permeability coefficient Lp for the porous support substrate 2 is not particularly limited, unless an object of the present invention is impaired, the example thereof being 200 L/(m$^2$·h·MPa) to 3500 L/(m$^2$·h·MPa).

As the porous support substrate 2, for example, one having a two-layered structure may be used, which consists of a nonwoven fabric-type backing layer 2A and a porous plastic layer 2B formed on the surface of the backing layer 2A.

The backing layer 2A is formed into a sheet (layered form), in which fiber made of a resin is formed into a nonwoven fabric. For the resin used for the backing layer 2A, a resin is selected which is insoluble in an immersion solution (solvent) as mentioned below. Examples of the resin used for the backing layer 2A include polyester resins such as polyethylene terephthalate (PET) and polybutylene terephthalate (PBT), polyolefin resins such as ethylene and propylene, and the like.

Such a backing layer 2A possesses liquid permeability, because the backing layer 2A is composed of a nonwoven fabric.

The porous plastic layer 2B is composed of a porous plastic layer (sheet) layered on the surface of the backing layer 2A. The porous plastic layer 2B has a plurality of pores of about 0.001 μm to about 10 μm, the pores being provided through the porous plastic layer 2B in the thickness direction.

For the plastic material (resin material) composing the porous plastic layer 2B, a material is selected which is insoluble in an immersion solution (solvent) as mentioned below, and the shape itself is retained even in a situation where the pores are formed. Examples of the plastic material (resin material) used for the porous plastic layer 2B include polysulfone (PSF), polyacrylonitrile (PAN), and the like.

The pores may be appropriately formed through the porous plastic layer 2B by a publicly known method of forming pores, the method being not particularly limited.

The thickness of the porous support substrate 2 is not particularly limited, unless an object of the present invention is impaired, and may be appropriately set depending on such an object, the example of the range being set to be from 20 μm to 100 μm.

Examples of marketed porous support substrate include UF membrane (product name "GR40PP", made by ALFA LAVAL), UF membrane (product name "MW2450F30", made by General Electric Company), and the like.

Other layers may be layered to form the porous support substrate 2, unless an object of the present invention is impaired.

<Carbon Membrane>

The carbon membrane 3 is a portion serving as an active layer of the reverse osmosis membrane 1, and is formed in the carbon membrane forming step in the method of forming a reverse osmosis membrane as mentioned below.

The carbon membrane 3 does not have those pores formed therethrough, which have sizes as found in the pores formed through the porous plastic layer 2B of the porous support substrate 2.

The carbon membrane 3 has a diamond-like-carbon (DLC) structure. The carbon membrane 3 includes, in addition to sp$^2$ hybridized carbon atoms (graphite structure), sp$^3$ hybridized carbon atoms (diamond structure), in which the proportion of such sp$^3$ hybridized carbon atoms is higher.

Note that, in addition to carbon atoms, the carbon membrane 3 includes nitrogen atoms.

The thickness of the carbon membrane 3 is set, for example, to be in the range of 5 nm to 100 nm, unless an object of the present invention is impaired.

It is confirmed that the reverse osmosis membrane 1 has durability and chlorine resistance.

<Method for Forming Reverse Osmosis Membrane>

A method of forming a reverse osmosis membrane of this embodiment includes a coating membrane forming step, a carbon membrane forming step, and a removing-by-dissolving step.

<Coating Membrane Forming Step>

The coating membrane forming step is a step of forming a coating membrane which is soluble in a predetermined solvent on the surface of the porous support substrate 2 that is insoluble in the solvent.

The coating membrane is preliminarily formed on the surface of the porous support substrate 2 before the carbon membrane 3 is formed. The coating membrane is formed such that the coating membrane blocks the pores provided through the porous plastic layer 2B of the porous support substrate 2, as well as covers the surface of the porous plastic layer 2B.

The coating membrane is not particularly limited, provided that the coating membrane can be removed by the predetermined solvent (immersion solution) in the removing-by-dissolving step as mentioned below, and may be appropriately selected from publicly known resin materials and publicly known solvents depending on purposes. Examples of such a coating membrane include a polyvinylpyrrolidone (PVP) solution prepared by dissolving a powder of PVP in a mixed solvent of water and ethanol, and the like.

A method of forming a coating membrane on the surface of the porous support substrate 2 (the surface of the porous plastic layer 2B) is not particularly limited, and a publicly known coating method is applied. Examples of such a method include a method of forming a coating membrane including dropping, on the surface of the porous support substrate 2, a coating solution for forming the coating membrane, and uniformly spreading the coating solution over the surface of the porous support substrate 2 with the use of a coater, and the like. Herein, the coating membrane on the porous support substrate 2 is appropriately dried.

The thickness of the coating membrane is not particularly limited, unless an object of the present invention is impaired, and, for example, a coating solution for forming the coating membrane is applied in the range of 1 mg/cm$^2$ to 20 mg/cm$^2$ (solid content) to the surface of the porous support substrate (per unit area).

<Carbon Membrane Forming Step>

The carbon membrane forming step is a step of forming the carbon membrane 3 on the coating membrane by a physical vapor deposition which deposits carbon as a target material under an atmosphere where rare gas and nitrogen gas are contained.

The carbon membrane 3 is formed so as to be layered over the coating membrane on the porous support substrate 2 using a physical vapor deposition which deposits carbon as a target material. Examples of the physical vapor deposition include a high power impulse magnetron sputtering (HiPIMS) as mentioned below, and the like.

The carbon used as a target material is not particularly limited, unless an object of the present invention is impaired, and an example of the carbon is preferably high purity graphite, particularly preferably high purity graphite with the purity of 5N or more (the purity of 99.999% or more).

In the carbon membrane forming step, a physical vapor deposition such as HiPIMS for forming the carbon membrane 3 is carried out under an atmosphere where rare gas and nitrogen gas are contained.

The rare gas includes argon (Ar), neon (Ne), krypton (Kc), xenon (Xe), and the like.

When the carbon membrane 3 is formed, the nitrogen gas is used as an essential ingredient, in conjunction with the rare gas such as argon. The ratio of the rare gas to the nitrogen gas in a process gas is set, for example, to be rare gas (Ar):nitrogen gas=1:0.1 to 1:10 during membrane formation of the carbon membrane 3.

The thickness of the carbon membrane 3 is adjusted by appropriately setting a time for membrane formation.

<Removing-by-Dissolving Step>

The removing-by-dissolving step is a step of removing the coating membrane by dissolving the same in the predetermined solvent after formation of the carbon membrane.

After the carbon membrane 3 is formed on the coating membrane, the porous support substrate 2 on which these membranes have been formed is immersed in the predetermined solvent during a predetermined time, allowing the coating membrane to be dissolved and removed.

When the coating membrane is made from, for example, PVP, an ethanol water solution (the volume ratio is ethanol:water=8:2) is used as the solvent for dissolving and removing the coating membrane.

Note that, depending on the kind of the coating membrane, as the solvent for dissolving and removing the coating membrane, publicly known organic solvents such as ether, ethyl acetate, acetone, and dichloromethane may be used, in addition to water or alcohol such as ethanol. These may be used alone or in combination of two or more kinds thereof.

When the coating membrane is immersed in the predetermined solvent, the coating membrane begins to dissolve into the solvent and is removed from the porous support substrate 2. As a result, the reverse osmosis membrane 1 is obtained such that the carbon membrane 3 is layered on the porous plastic layer 2B of the porous support substrate 2.

Herein, after the predetermined time passes, the porous support substrate 2 is taken out from the solvent and appropriately dried, with the result that the reverse osmosis membrane 1 is obtained.

EXAMPLES

Hereinafter, a more detailed description is made of the present invention with reference to EXAMPLES. Note that the present invention is not limited by these EXAMPLES at all.

Example 1

<Porous Support Substrate>

As a porous support substrate, an ultrafiltration membrane (product name "GR40PP", made by ALFA LAVAL) was prepared. The porous support substrate consists of a non-woven fabric-type backing layer made from a resin, and a porous plastic layer made of polysulfone (PSF) layered on one side of the backing layer.

<Coating Membrane Forming Step>

Dropping on the surface of the porous plastic layer a polyvinylpyrrolidone (PVP) solution (10% by mass), and uniformly spreading the solution with the use of a bar coater allowed a PVP coating (coating membrane) composed of the polyvinylpyrrolidone (PVP) solution (10% by mass) to be formed on the surface of the porous support substrate. Subsequently, leaving the resultant at room temperature for 10 hours and drying the PVP coating on the porous support substrate resulted in the porous support substrate provided with the PVP coating.

Herein, as PVP in the PVP solution, a PVP powder (product name "POLYVINYLPYRROLIDONE K30", made by WAKO PURE CHEMICAL INDUSTRIES, LTD.) was used. In addition, as a solvent for the PVP solution, a mixed solvent of ethanol and water (ethanol:water=8:2 (volume ratio)) was used.

<Carbon Membrane Forming Step>

Using a high power impulse magnetron sputtering (HiPIMS), a carbon membrane was formed so as to be layered over the PVP coating on the porous support substrate. The condition for membrane formation of the carbon membrane was as follows.

<Condition for Membrane Formation: Example 1>

Device for membrane formation: Batch type carbon membrane forming device
Duty ratio: 25%
Frequency: 1.5 kHz
Duty cycle: 180 μs
Process gas (ratio): Ar (50%), $N_2$ (50%)
Target material: High purity graphite (purity: 99.999%)
Peak power density: 1.14 $Wcm^{-2}$
Power density: 0.09 $Wcm^{-2}$
Membrane formation pressure: 0.61 Pa
Membrane formation time: 825 seconds <Removing-by-Dissolving Step>

The porous support substrate on which the carbon membrane had been formed was immersed in an immersion solution (pure water: 50 v/v %, ethanol 50 v/v %) in a predetermined container for 8 hours or longer, thereby removing the PVP coating by dissolving. Subsequently, the porous support substrate was taken out of the immersion solution and washed with pure water. The resultant was used as a reverse osmosis membrane of EXAMPLE 1.

Example 2

In the same manner as EXAMPLE 1 except for the carbon membrane forming step, a reverse osmosis membrane was obtained in which the carbon membrane had been formed on the porous support substrate. The condition for membrane formation of the carbon membrane in EXAMPLE 2 was as follows.

<Condition for Membrane Formation: Example 2>

Device for membrane formation: Batch type carbon membrane forming device
Duty ratio: 25%
Frequency: 1.5 kHz Duty cycle: 180 μs
Process gas (ratio): Ar (48%), $N_2$ (48%), $CH_4$ (4%)
Target material: High purity graphite (purity: 99.999%)
Peak power density: 2.91 $Wcm^{-2}$
Power density: 0.23 $Wcm^{-2}$
Membrane formation pressure: 0.64 Pa
Membrane formation time: 315 seconds Example 3

In the same manner as EXAMPLE 1 except for the carbon membrane forming step, a reverse osmosis membrane was obtained in which the carbon membrane had been formed on the porous support substrate. The condition for membrane formation of the carbon membrane in EXAMPLE 3 was as follows.
<Condition for Membrane Formation: Example 3>
Device for membrane formation: Batch type carbon membrane forming device
Duty ratio: 25%
Frequency: 1.5 kHz
Duty cycle: 180 μs
Process gas (ratio): Ar (48%), $N_2$ (48%), $CH_4$ (4%)
Target material: High purity graphite (purity: 99.999%)
Peak power density: 2.91 $Wcm^{-2}$
Power density: 0.23 $Wcm^{-2}$
Membrane formation pressure: 0.64 Pa
Membrane formation time: 262 seconds Comparative Example 1

In the same manner as EXAMPLE 1 except for the carbon membrane forming step, a comparative membrane was obtained in which the carbon membrane had been formed on the porous support substrate. The condition for membrane formation of the carbon membrane in COMPARATIVE EXAMPLE 1 was as follows.
<Condition for Membrane Formation: Comparative Example 1>
Device for membrane formation: Batch type carbon membrane forming device
Duty ratio: 25%
Frequency: 1.5 kHz
Duty cycle: 180 μs
Process gas (ratio): Ar (100%)
Target material: High purity graphite (purity: 99.999%)
Peak power density: 2.09 $Wcm^{-2}$
Power density: 0.24 $Wcm^{-2}$
Membrane formation pressure: 0.35 Pa
Membrane formation time: 1380 seconds Comparative Example 2

In the same manner as EXAMPLE 1 except for the carbon membrane forming step, a comparative membrane was obtained in which the carbon membrane had been formed on the porous support substrate. The condition for membrane formation of the carbon membrane in COMPARATIVE EXAMPLE 2 was as follows.
<Condition for Membrane Formation: Comparative Example 2>
Device for membrane formation: Batch type carbon membrane forming device
Duty ratio: 25%
Frequency: 1.5 kHz
Duty cycle: 180 μs
Process gas (ratio): Ar (92%), $CH_4$ (8%)
Target material: High purity graphite (purity: 99.999%)
Peak power density: 8.47 $Wcm^{-2}$
Power density: 0.65 $Wcm^{-2}$
Membrane formation pressure: 0.38 Pa
Membrane formation time: 160 seconds
<Thickness of Carbon Membrane>

The thickness of each carbon membrane of EXAMPLES 1 to 3 and COMPARATIVE EXAMPLES 1 and 2 was measured using a spectroscopic ellipsometer. The measurement result indicates that the thickness of each carbon membrane of EXAMPLES 1 to 3 and COMPARATIVE EXAMPLES 1 and 2 was approximately 30 nm (30±2 nm).
<SEM Observation for Carbon Membrane>

Figure 2:
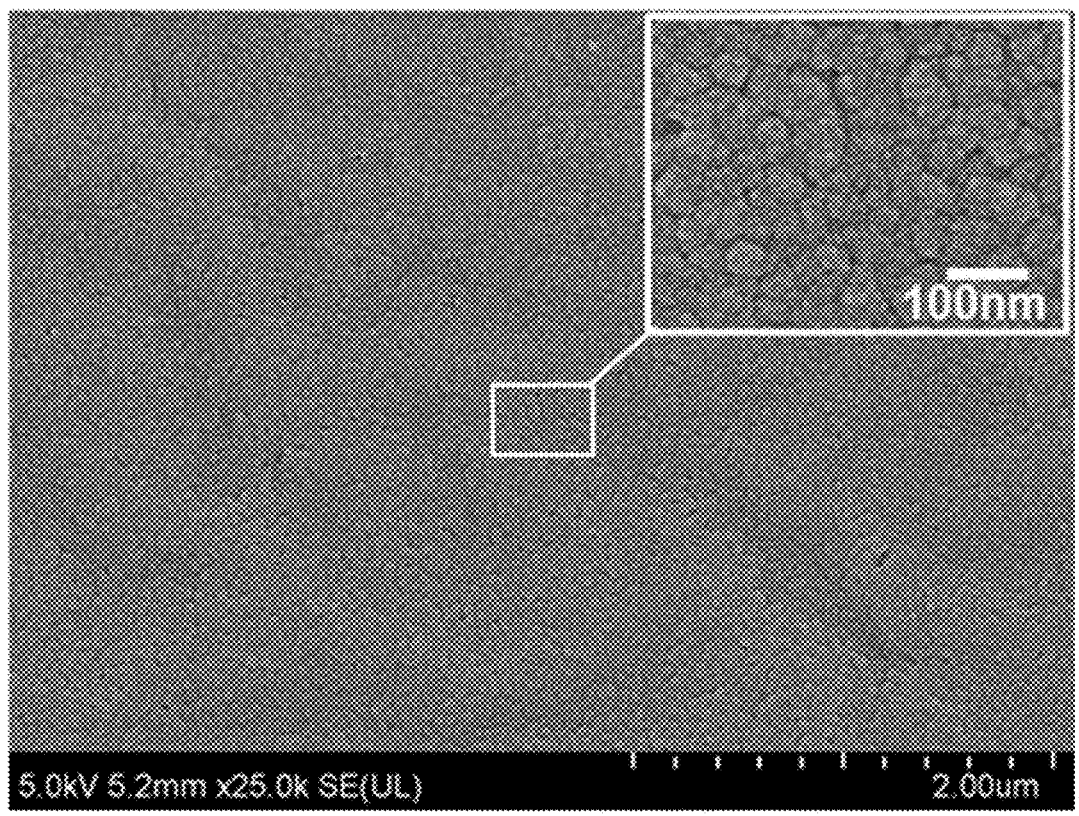
FIG. 2 is a surface SEM image of the reverse osmosis membrane of EXAMPLE 1.
Figure 3:
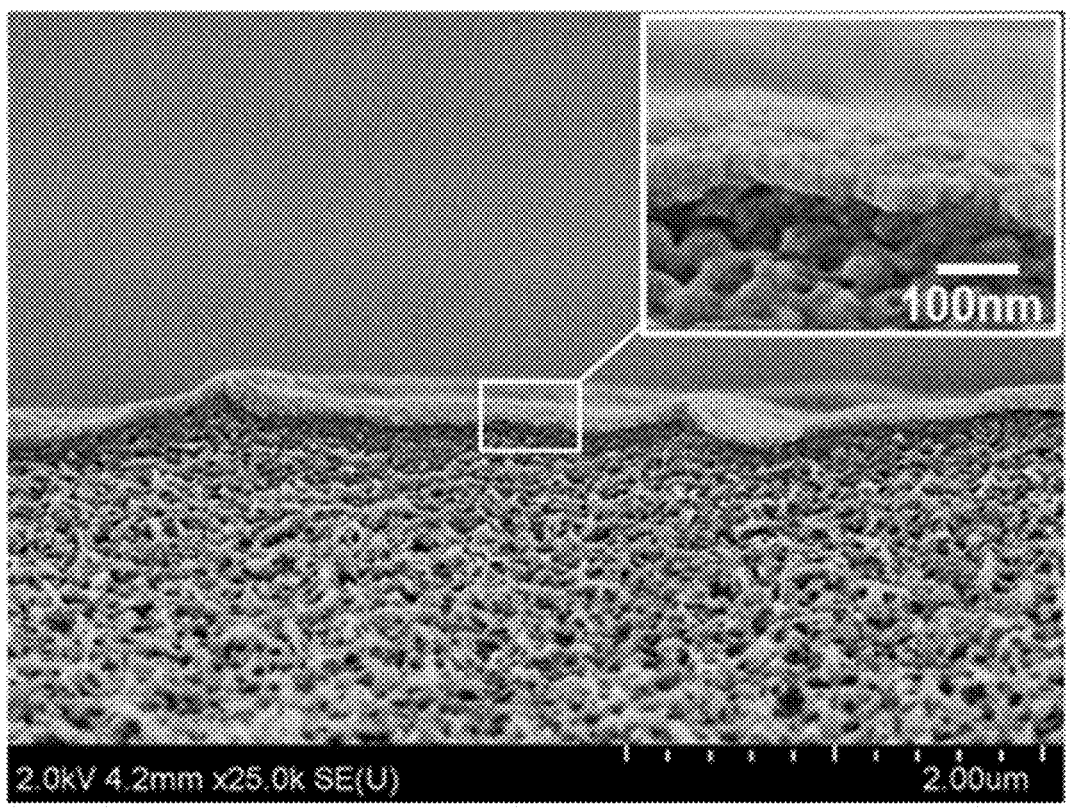
FIG. 3 is a cross-sectional SEM image of the reverse osmosis membrane of EXAMPLE 1.
Figure 4:
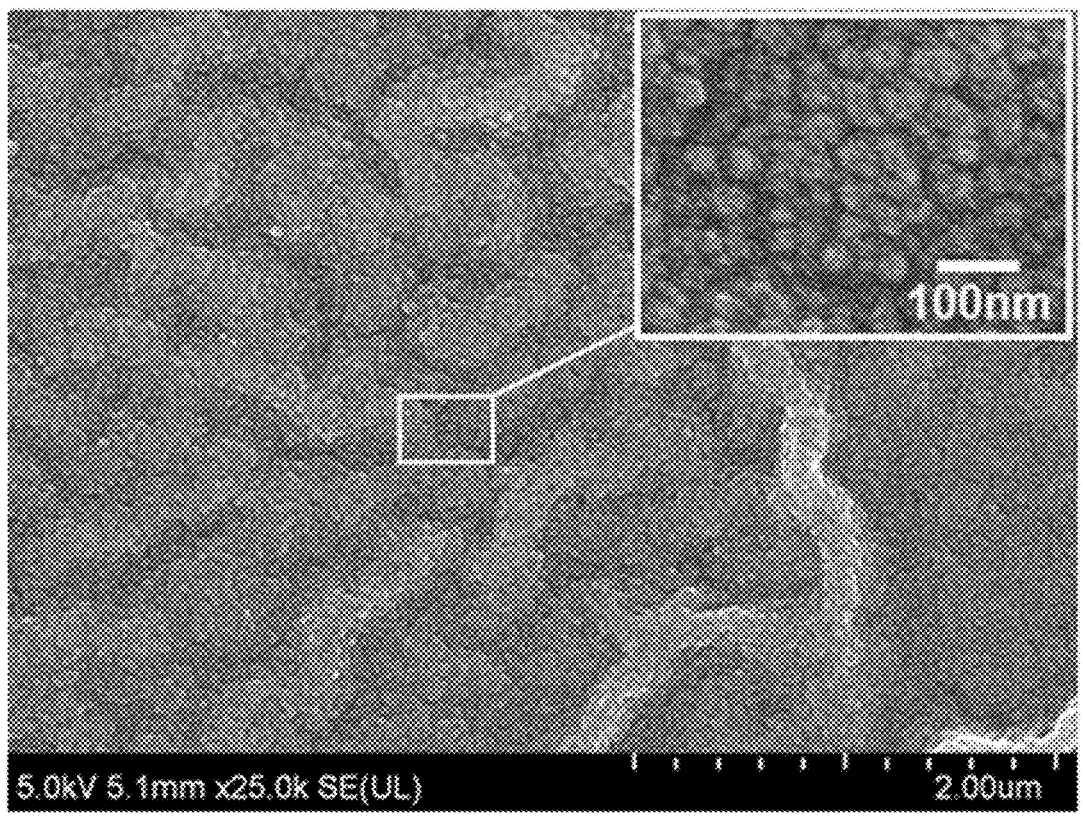
FIG. 4 is a surface SEM image of the reverse osmosis membrane of EXAMPLE 2.
Figure 5:
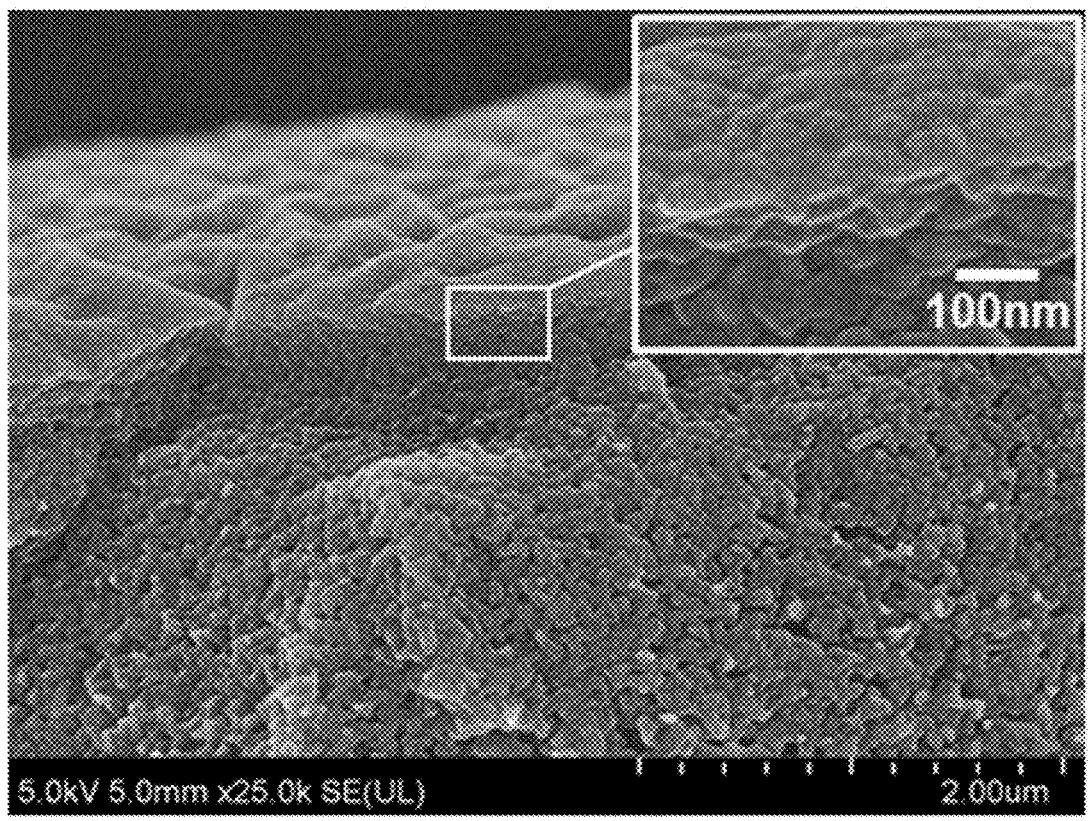
FIG. 5 is a cross-sectional SEM image of the reverse osmosis membrane of EXAMPLE 2.
Figure 6:
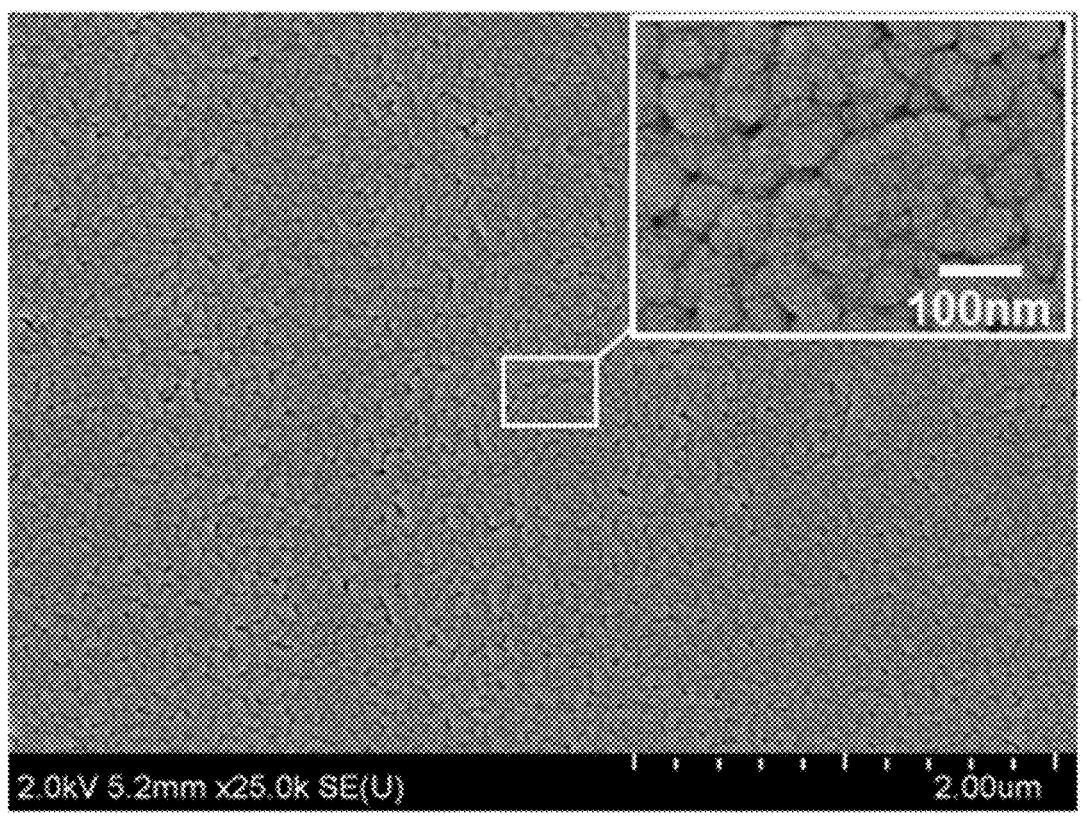
FIG. 6 is a surface SEM image of the reverse osmosis membrane of COMPARATIVE EXAMPLE 1.
Figure 7:
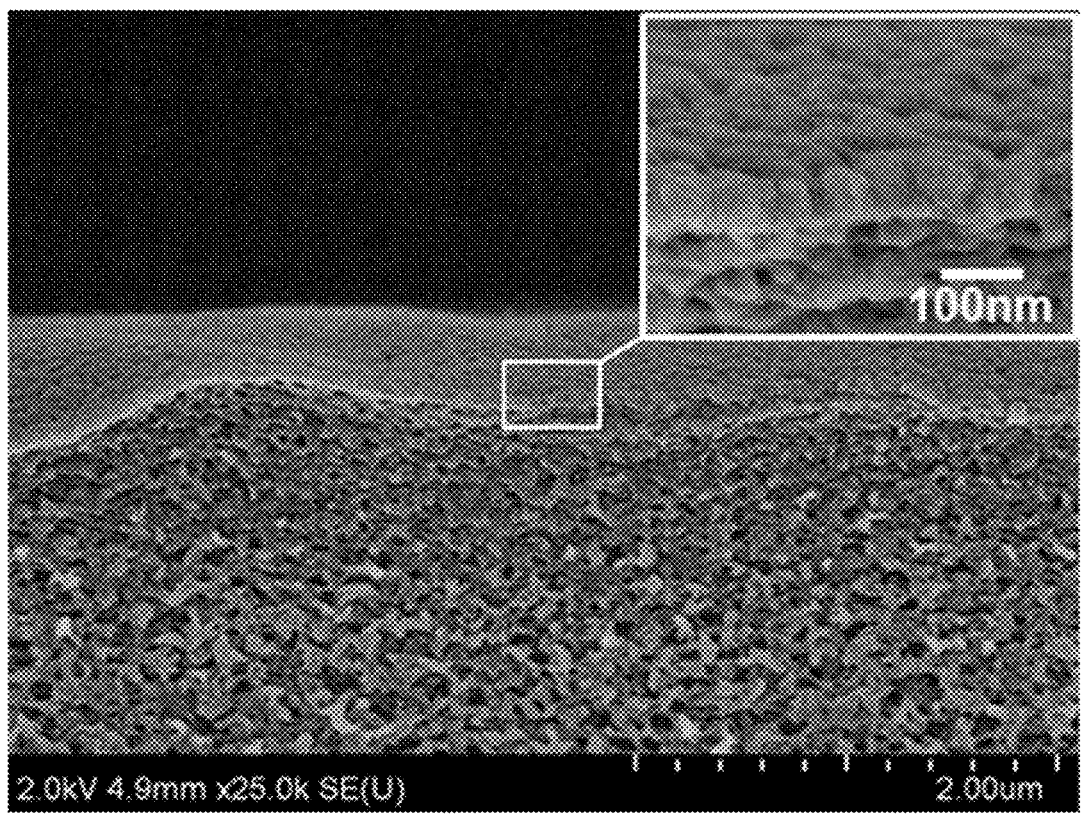
FIG. 7 is a cross-sectional SEM image of the reverse osmosis membrane of COMPARATIVE EXAMPLE 1.
Figure 8:
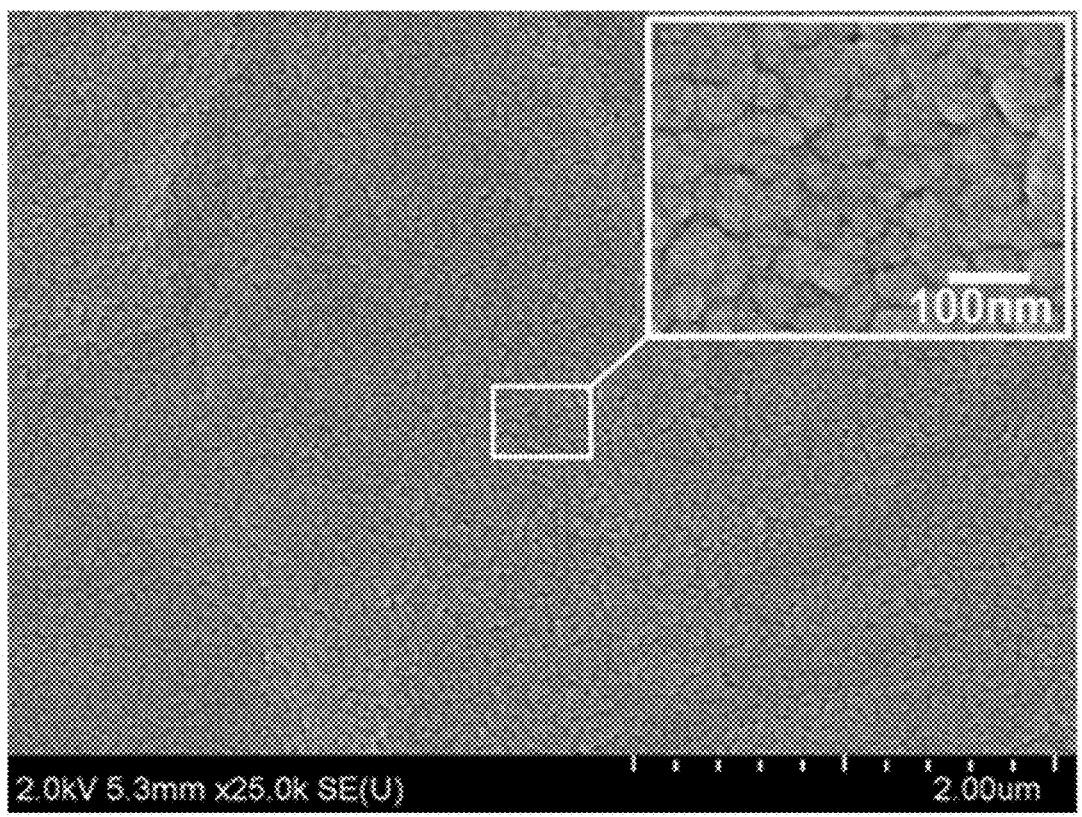
FIG. 8 is a surface SEM image of the reverse osmosis membrane of COMPARATIVE EXAMPLE 2.
Figure 9:
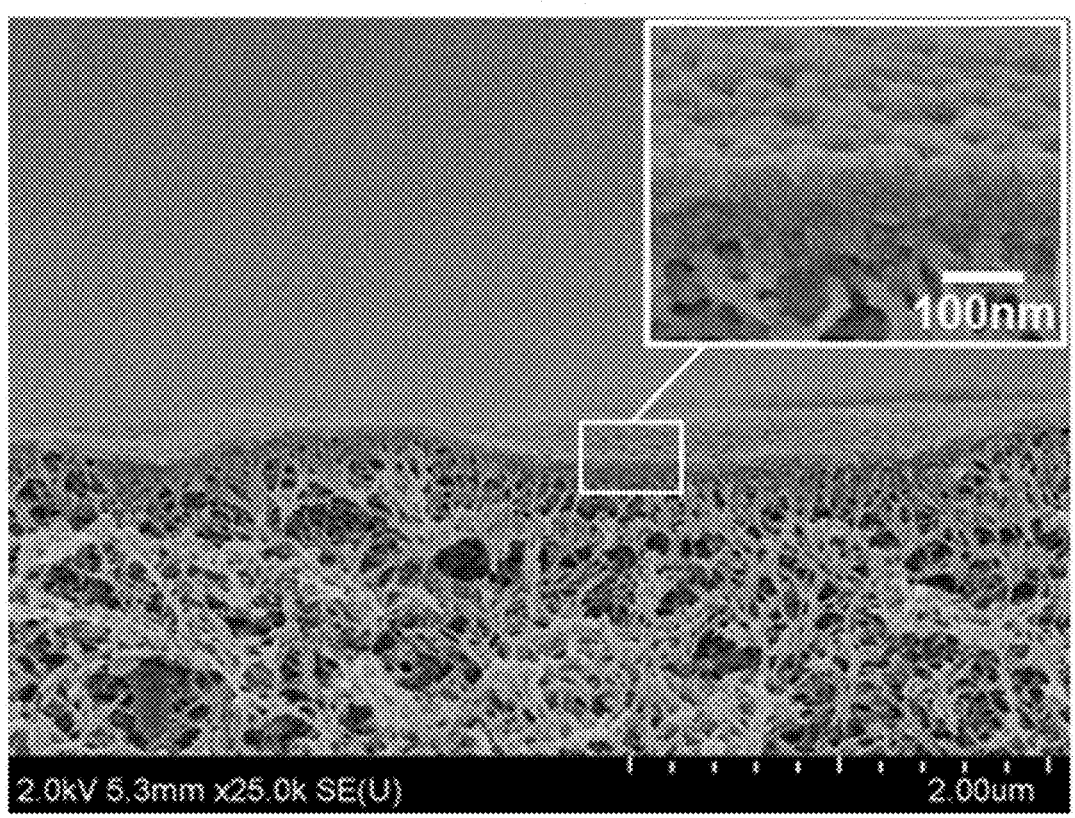
FIG. 9 is a cross-sectional SEM image of the reverse osmosis membrane of COMPARATIVE EXAMPLE 2.

The surface and the cross-section of each reverse osmosis membrane of EXAMPLES 1 and 2 and COMPARATIVE EXAMPLES 1 and 2 were observed using a scanning electron microscope (SEM). A surface image and cross-sectional image of the reverse osmosis membrane of EXAMPLE 1 by SEM are shown in FIGS. 2 and 3, a surface image and cross-sectional image of the reverse osmosis membrane of EXAMPLE 2 by SEM are shown in FIGS. 4 and 5, a surface image and cross-sectional image of the reverse osmosis membrane of COMPARATIVE EXAMPLE 1 by SEM are shown in FIGS. 6 and 7, and a surface image and cross-sectional image of the reverse osmosis membrane of COMPARATIVE EXAMPLE 2 by SEM are shown in FIGS. 8 and 9.

Figure 10:
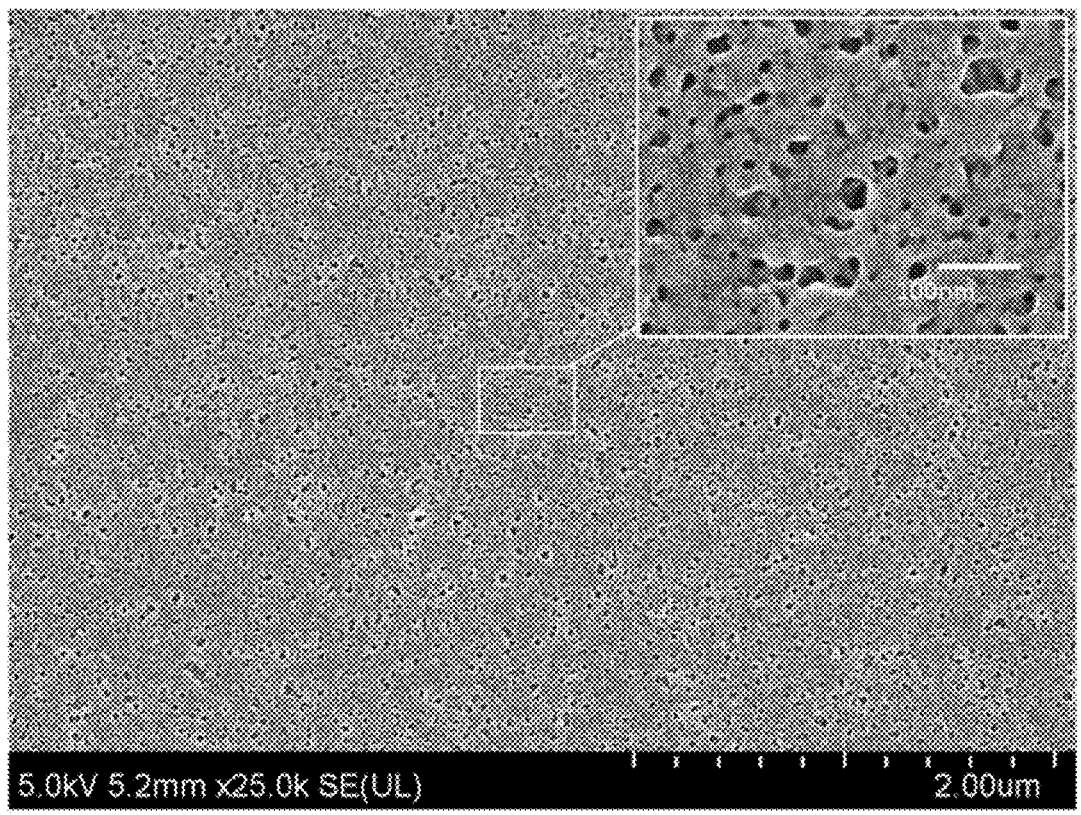
FIG. 10 is a surface SEM image of a porous support substrate.
Figure 11:
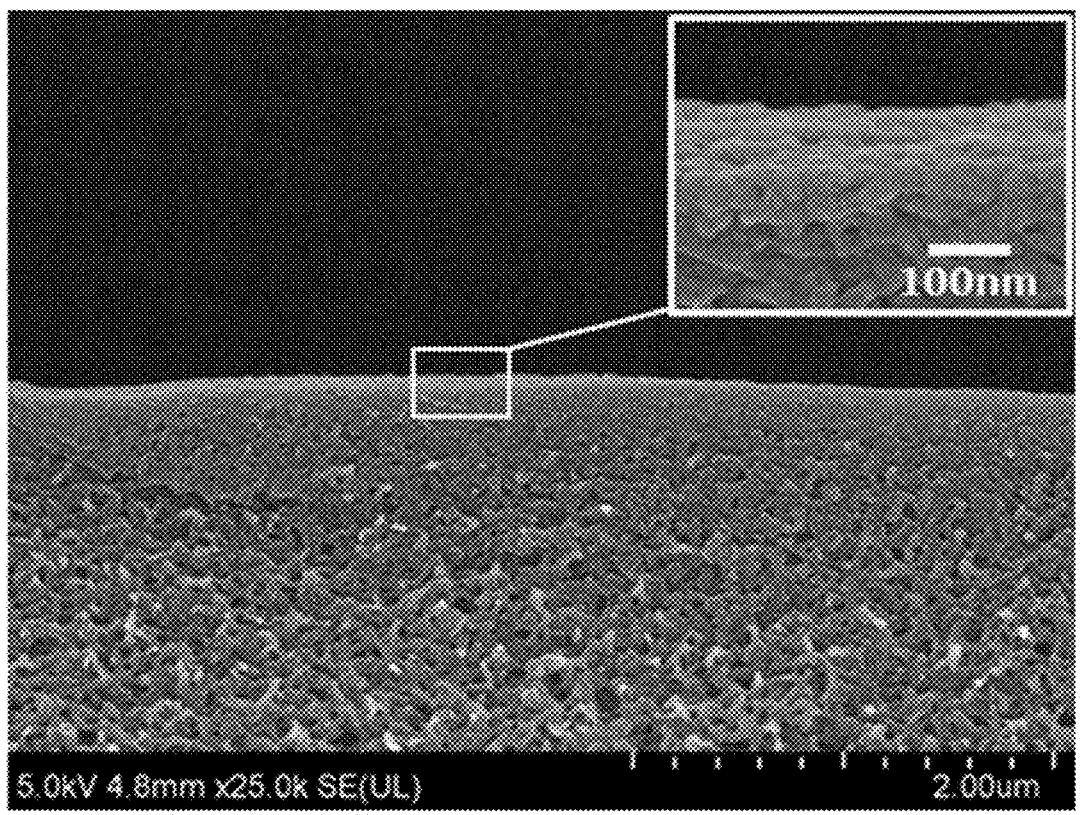
FIG. 11 is a cross-sectional SEM image of a porous support substrate.
Figure 12:
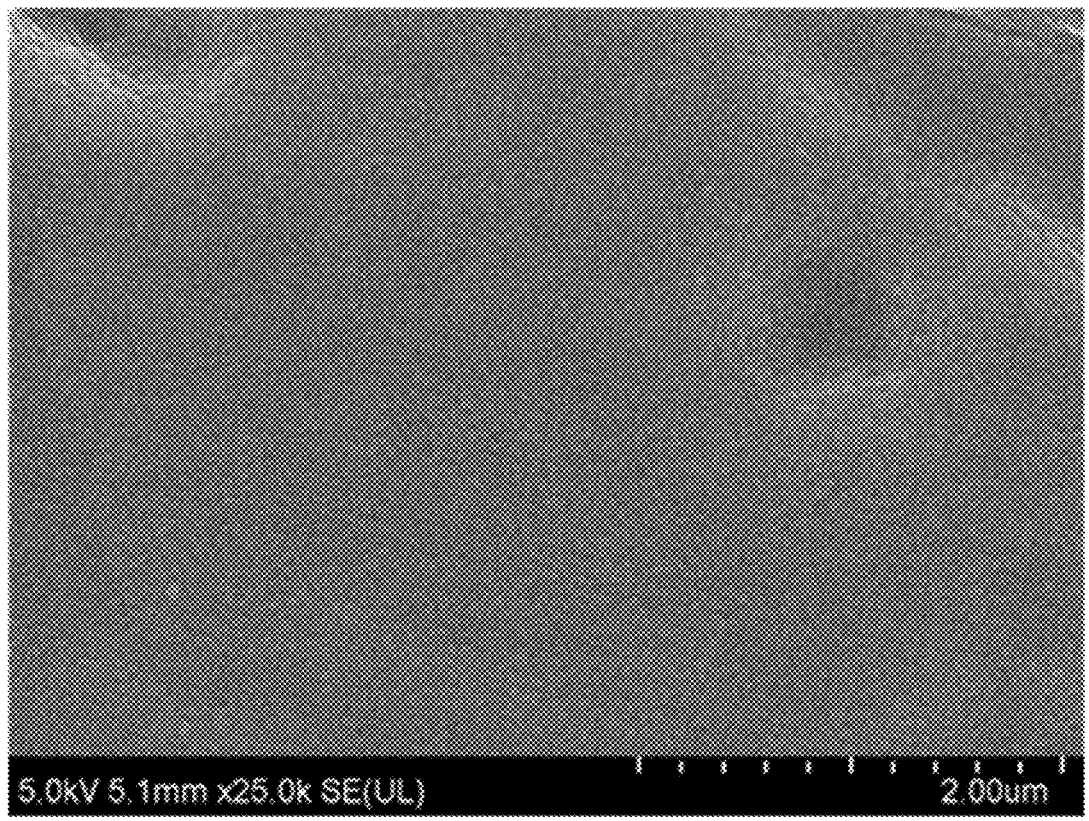
FIG. 12 is a surface SEM image of a porous support substrate provided with a PVP coating.
Figure 13:
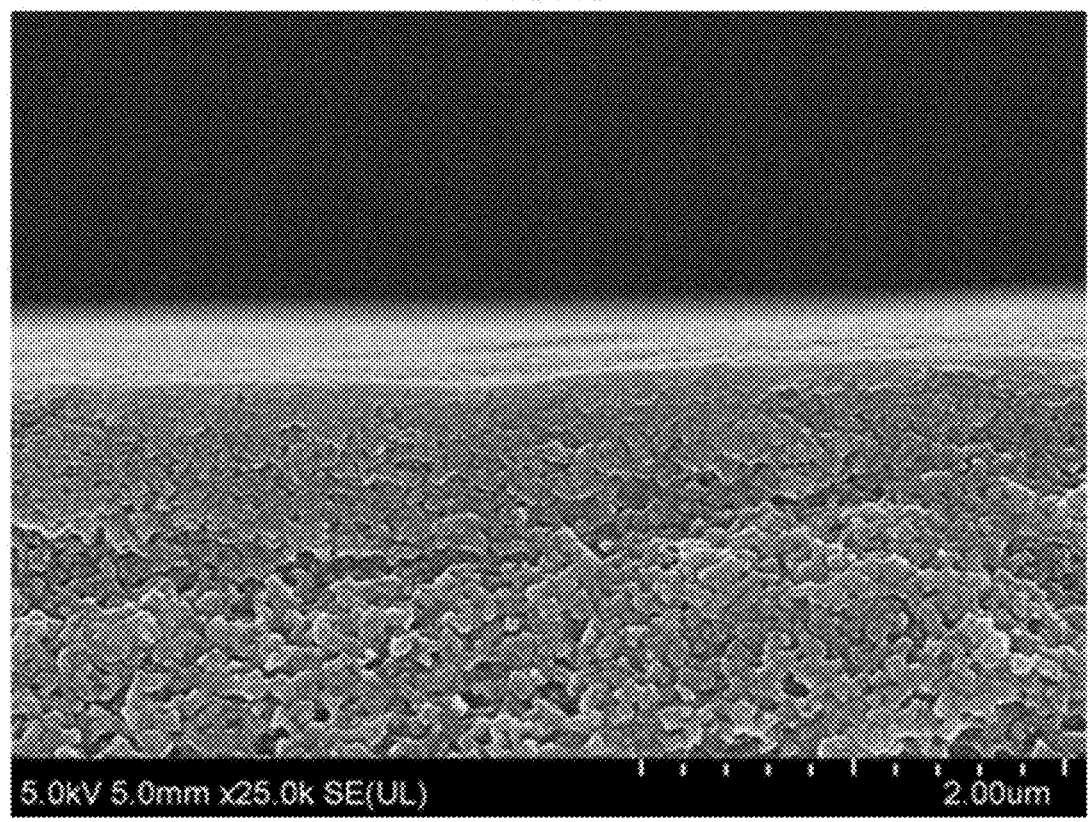
FIG. 13 is a cross-sectional SEM image of a porous support substrate provided with a PVP coating.
Figure 14:
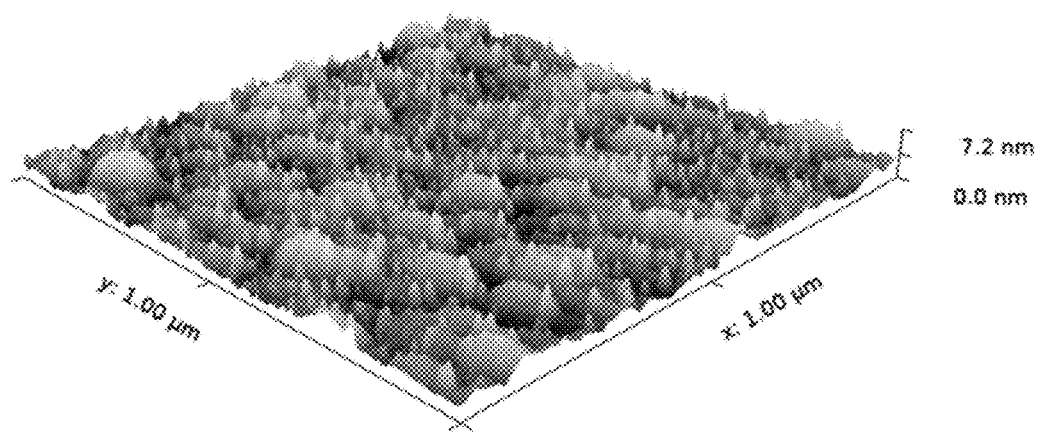
FIG. 14 is a result of AFM observation for the carbon membrane of EXAMPLE 1 (topography)
Figure 15:
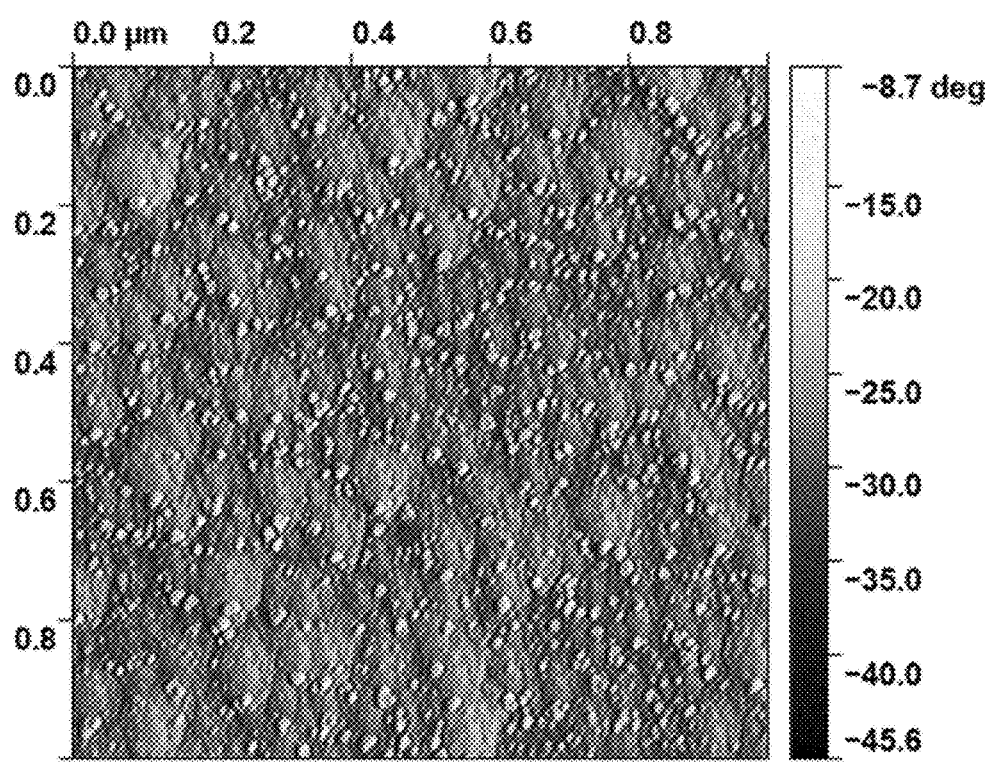
FIG. 15 is a result of AFM observation for the carbon membrane of EXAMPLE 1 (phase)
Figure 16:
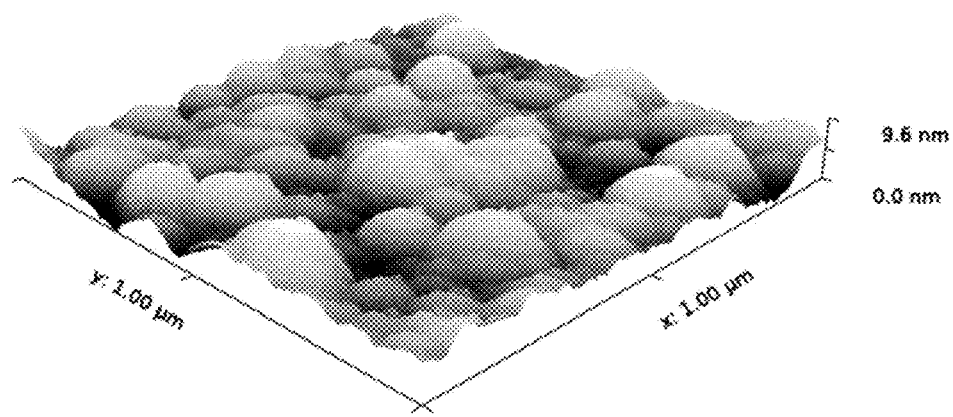
FIG. 16 is a result of AFM observation for the carbon membrane of EXAMPLE 2 (topography)
Figure 17:
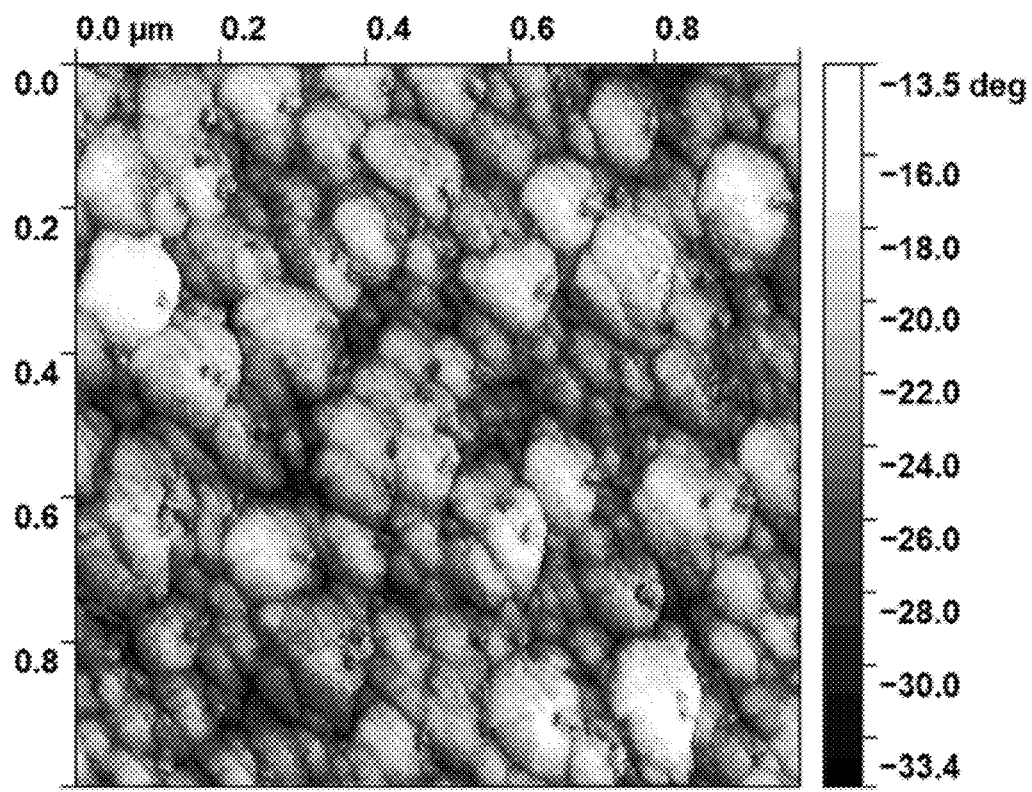
FIG. 17 is a result of AFM observation for the carbon membrane of EXAMPLE 2 (phase)
Figure 18:
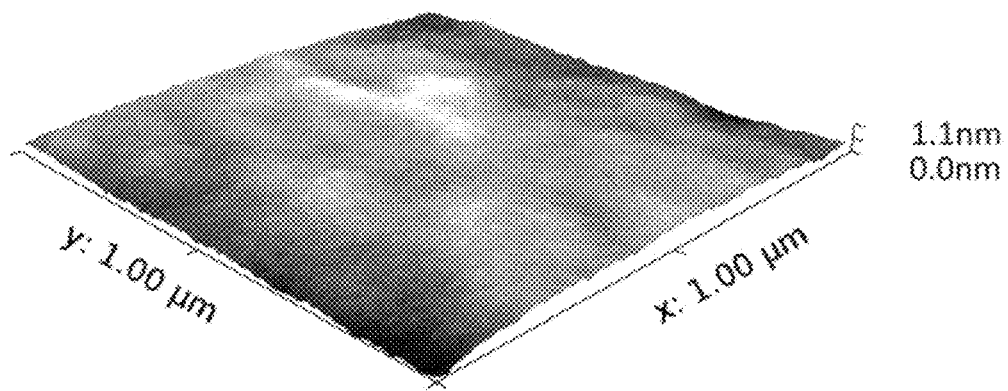
FIG. 18 is a result of AFM observation for the carbon membrane of COMPARATIVE EXAMPLE 1 (topography)
Figure 19:
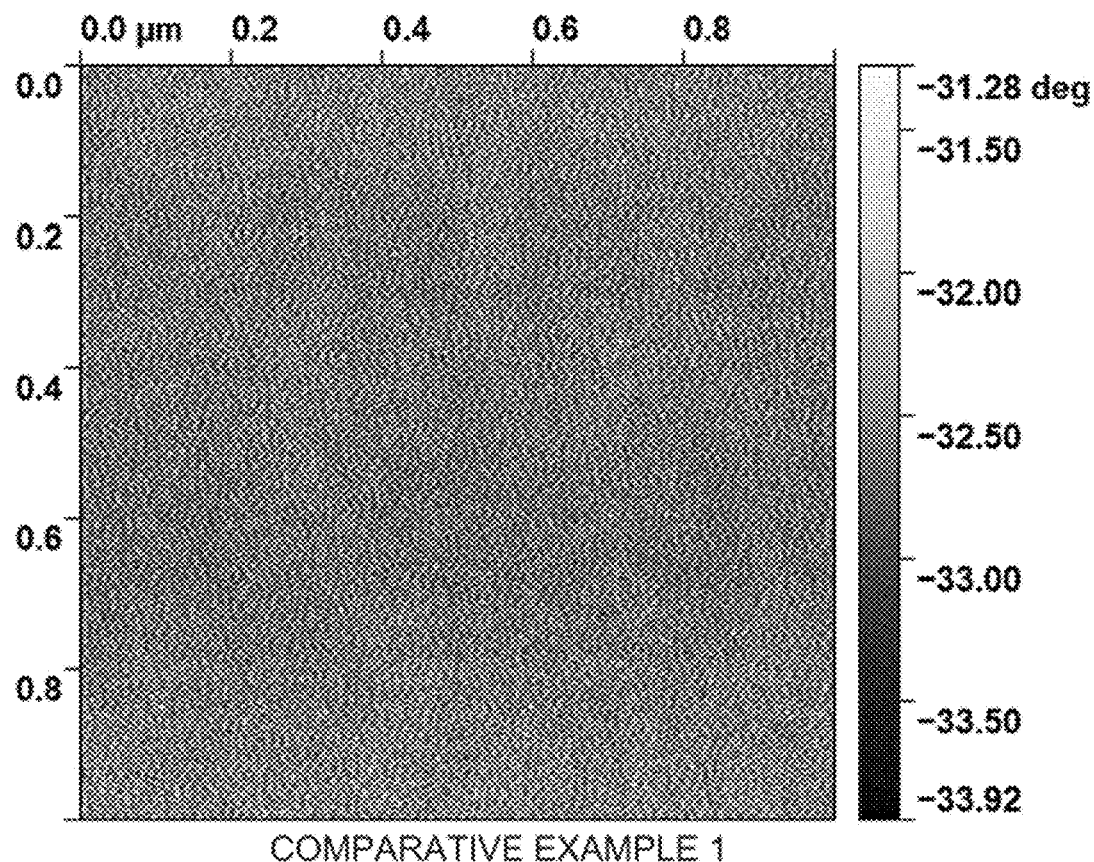
FIG. 19 is a result of AFM observation for the carbon membrane of COMPARATIVE EXAMPLE 1 (phase)
Figure 20:
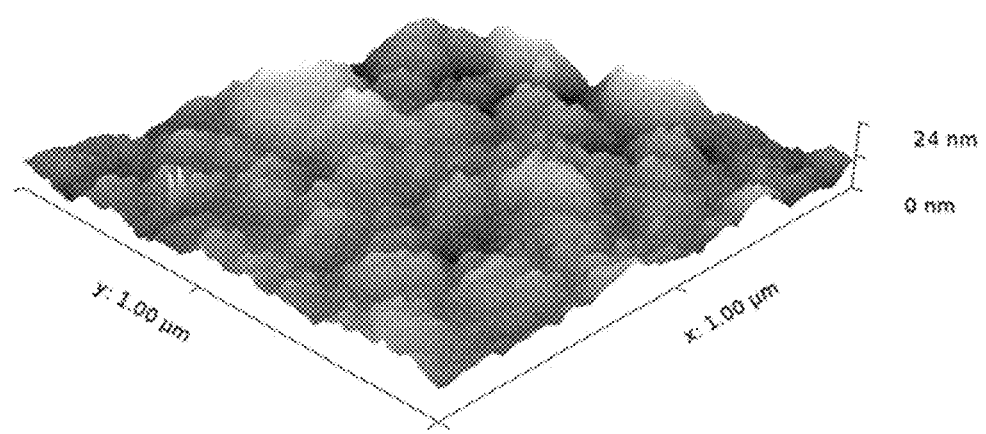
FIG. 20 is a result of AFM observation for the carbon membrane of COMPARATIVE EXAMPLE 2 (topography)
Figure 21:
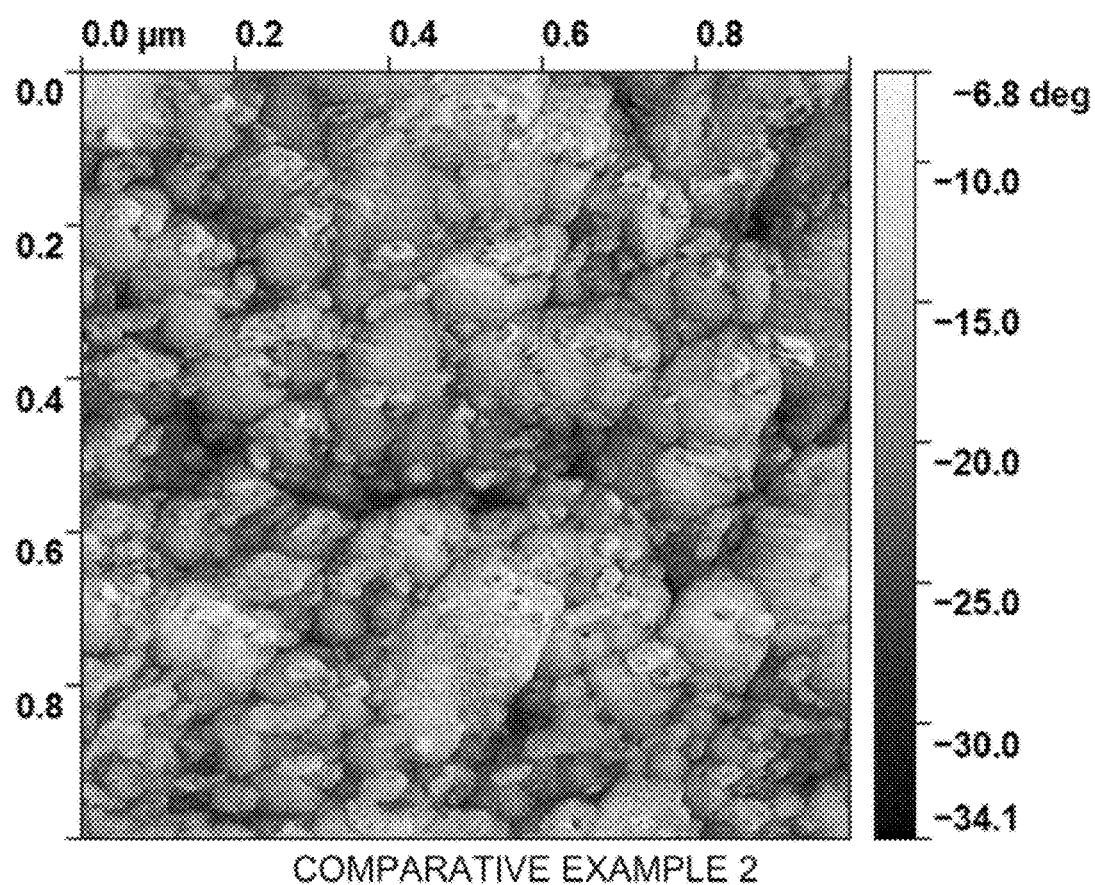
FIG. 21 is a result of AFM observation for the carbon membrane of COMPARATIVE EXAMPLE 2 (phase)
Figure 22:
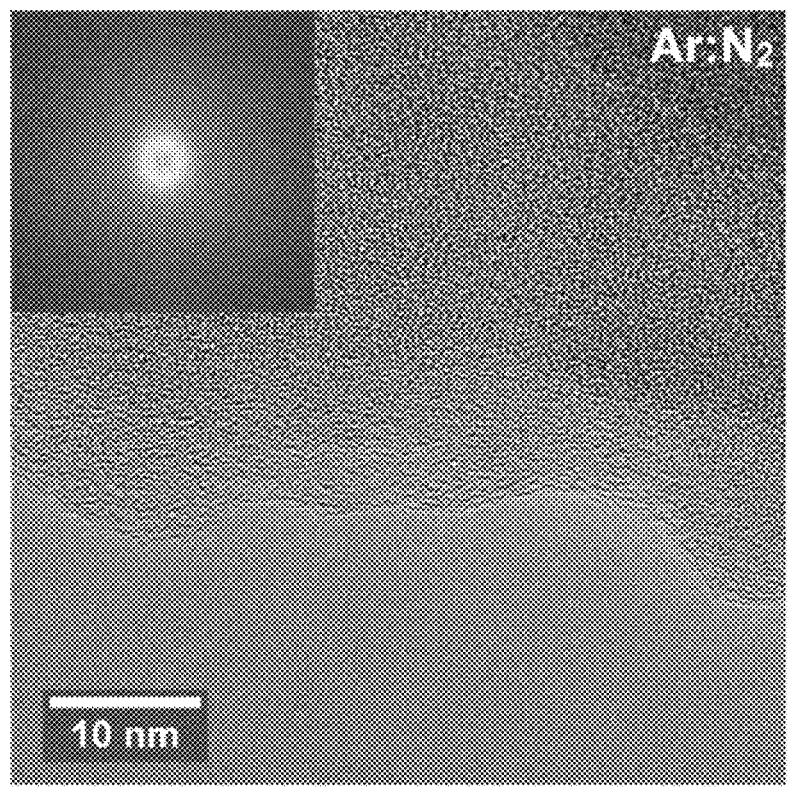
FIG. 22 is a surface TEM image of the carbon membrane of EXAMPLE 1.
Figure 23:
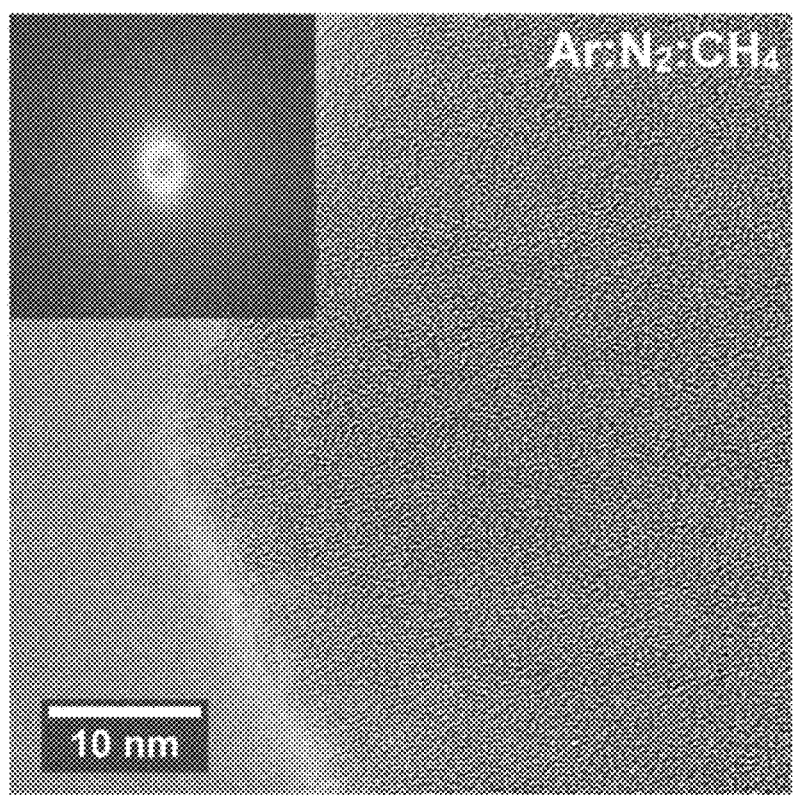
FIG. 23 is a surface TEM image of the carbon membrane of EXAMPLE 2.
Figure 24:
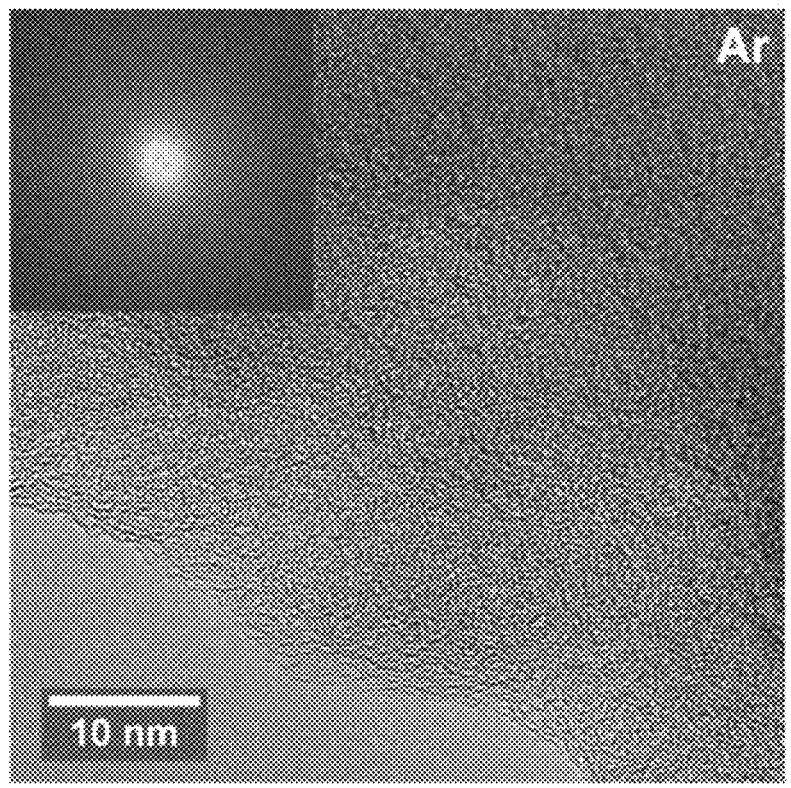
FIG. 24 is a surface TEM image of the carbon membrane of COMPARATIVE EXAMPLE 1.
Figure 25:
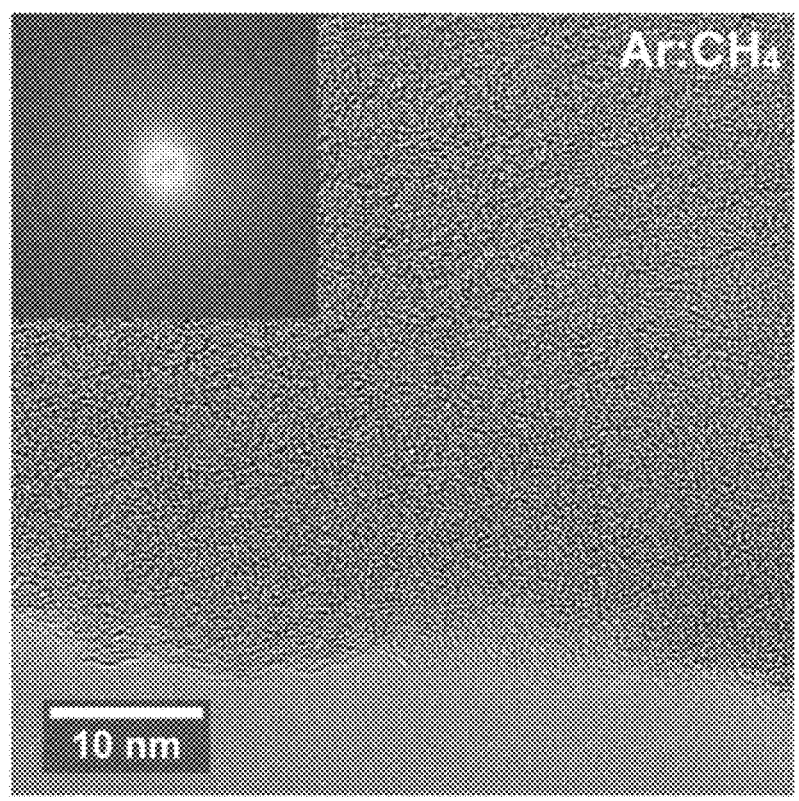
FIG. 25 is a surface TEM image of the carbon membrane of COMPARATIVE EXAMPLE 2.

For reference, an image of the surface of the porous support substrate before the carbon membrane is formed (surface of the porous plastic layer), and a cross-sectional image thereof by SEM are shown in FIGS. 10 and 11, respectively. In addition, an image of the surface of the porous support substrate provided with the PVP coating (surface of the PVP coating), and a cross-sectional image thereof by SEM are shown in FIGS. 12 and 13, respectively.

As shown in FIGS. 2 to 8, it is confirmed that, throughout the surface of the porous support substrate, a hole, crack or the like was not formed, but the carbon membrane was uniformly formed. In addition, a hole part that had been found in the surface of the porous support substrate (porous plastic layer) as shown in FIGS. 10 and 11 was not found in the carbon membrane. Furthermore, as shown in FIGS. 12 and 13, it is confirmed that, when the PVP coating was formed on the surface of the porous support substrate, the hole part in the surface of the porous support substrate (porous plastic layer) was blocked by the PVP coating.
<AFM Observation for Carbon Membrane>

Each carbon membrane of EXAMPLES 1 and 2 and COMPARATIVE EXAMPLES 1 and 2 was observed using an atomic force microscope (AFM), and the surface state of each carbon membrane in an order of nanosize was checked. The respective results (topography and phase) from AFM for EXAMPLES 1 and 2 and COMPARATIVE EXAMPLES 1 and 2 are shown in FIGS. 14 to 21. As shown in FIGS. 14 to 21, it is confirmed that, when methane gas was used as the process gas (EXAMPLE 2, COMPARATIVE EXAMPLE 2), the surface texture of the carbon membrane in an order of nanosize was drastically coarse, in comparison with the surface texture when methane gas was not used (EXAMPLE 1, COMPARATIVE EXAMPLE 1). This is because it seems that when methane gas was used as the process gas, a big cluster-like structure appeared in the carbon membrane. However, the relationship of the cluster-like structure with the performance of salt rejection or water permeability (mentioned below) was not recognized.

<TEM Observation for Carbon Membrane>

The surface of each carbon membrane of EXAMPLES 1 and 2 and COMPARATIVE EXAMPLES 1 and 2 was observed using a transmission electron microscope (TEM). TEM images of EXAMPLES 1 and 2 and COMPARATIVE EXAMPLES 1 and 2 are shown in FIGS. 22 to 25. As shown in FIGS. 22 to 25, it becomes clear that each carbon membrane of EXAMPLES 1 and 2 and COMPARATIVE EXAMPLES 1 and 2 had an amorphous-like structure.

<EELS Analysis of Carbon Membrane>

Figure 26:
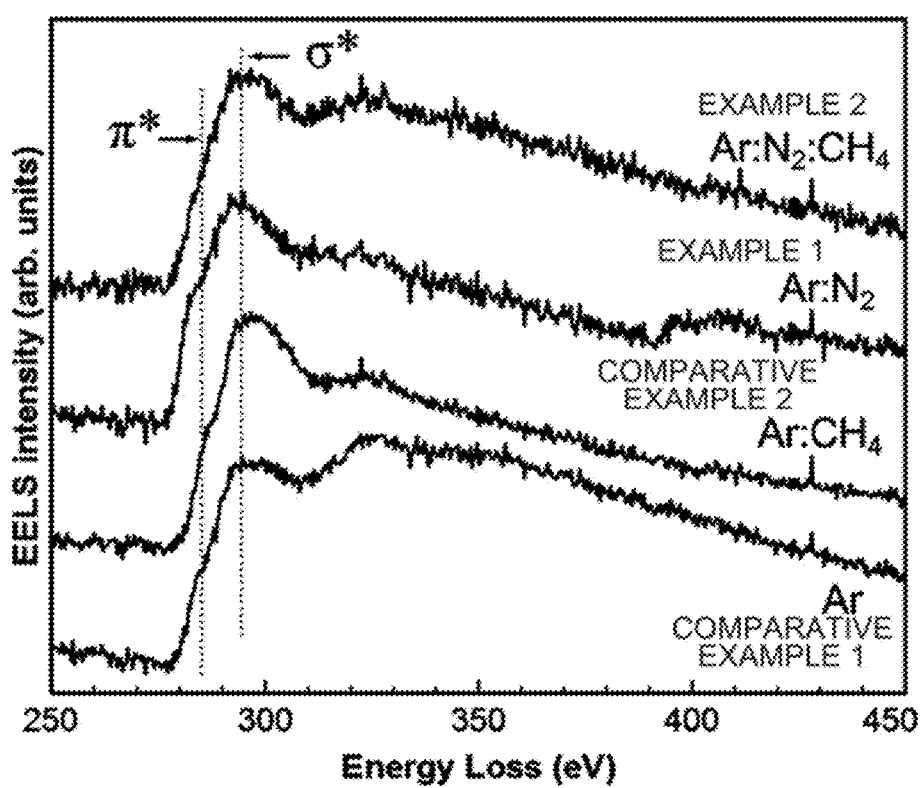
FIG. 26 is a graph showing EELS intensity against the energy loss in each carbon membrane of EXAMPLES and COMPARATIVE EXAMPLES.
Figure 27:
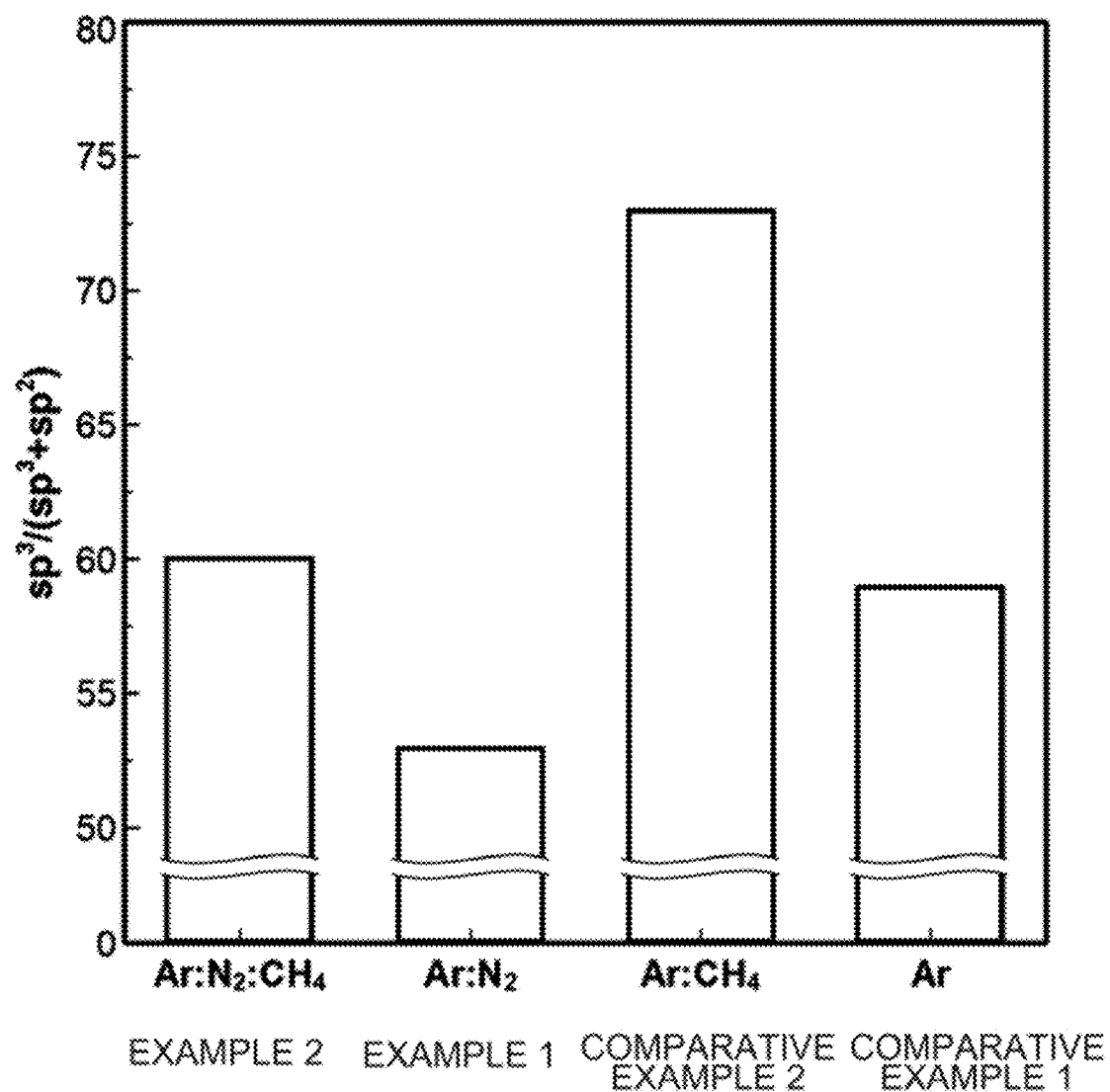
FIG. 27 is a graph showing the proportion of $sp^3$ carbon in each carbon membrane of EXAMPLES and COMPARATIVE EXAMPLES.

Each carbon membrane of EXAMPLES 1 and 2 and COMPARATIVE EXAMPLES 1 and 2 was analyzed using an electron energy-Loss spectroscopy (EELS). The analysis results from EELS are shown in FIGS. 26 and 27. FIG. 26 is a graph showing EELS intensity against the energy loss in each carbon membrane of EXAMPLES 1 and 2 and COMPARATIVE EXAMPLES 1 and 2, and FIG. 27 is a graph showing the proportion of $sp^3$ carbon in each carbon membrane of EXAMPLES 1 and 2 and COMPARATIVE EXAMPLES 1 and 2. FIG. 26 shows EELS spectra in the K-edge regions of carbon in the respective carbon membranes, in which it is indicated that the intensity from the 1s orbit to $\pi^*$ orbit is considerably lower than the intensity from the is orbit to $\sigma^*$ orbit. This seems to be due to high amorphous property in the carbon membrane.

In addition, as shown in FIG. 27, it is confirmed that the carbon membrane of EXAMPLE 1 had considerably lower proportion of $sp^3$ carbon, in comparison with the others. In contrast, it is confirmed that the carbon membrane of COMPARATIVE EXAMPLE 2 had considerably higher proportion of $sp^3$ carbon. In addition, it is confirmed that the carbon membrane of EXAMPLE 2 had slightly increased proportion of $sp^3$ carbon, in comparison with the carbon membrane of COMPARATIVE EXAMPLE 1, while having considerably lower proportion of $sp^a$ carbon, in comparison with the carbon membrane of COMPARATIVE EXAMPLE 2.

<XPS Analysis ($sp^3/sp^2$)>

Figure 28:
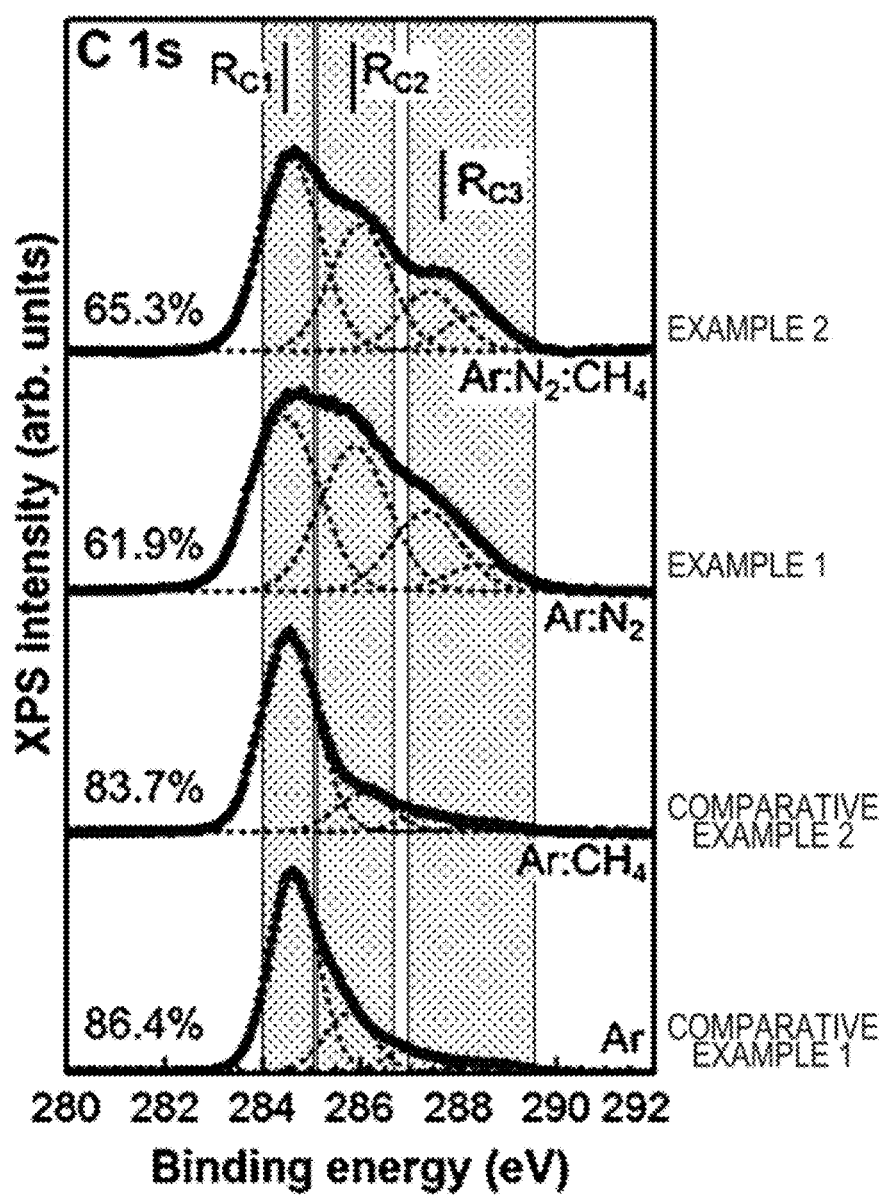
FIG. 28 is a graph showing a result of XPS for the carbon membranes in respective EXAMPLES and COMPARATIVE EXAMPLES (C1s)
Figure 29:
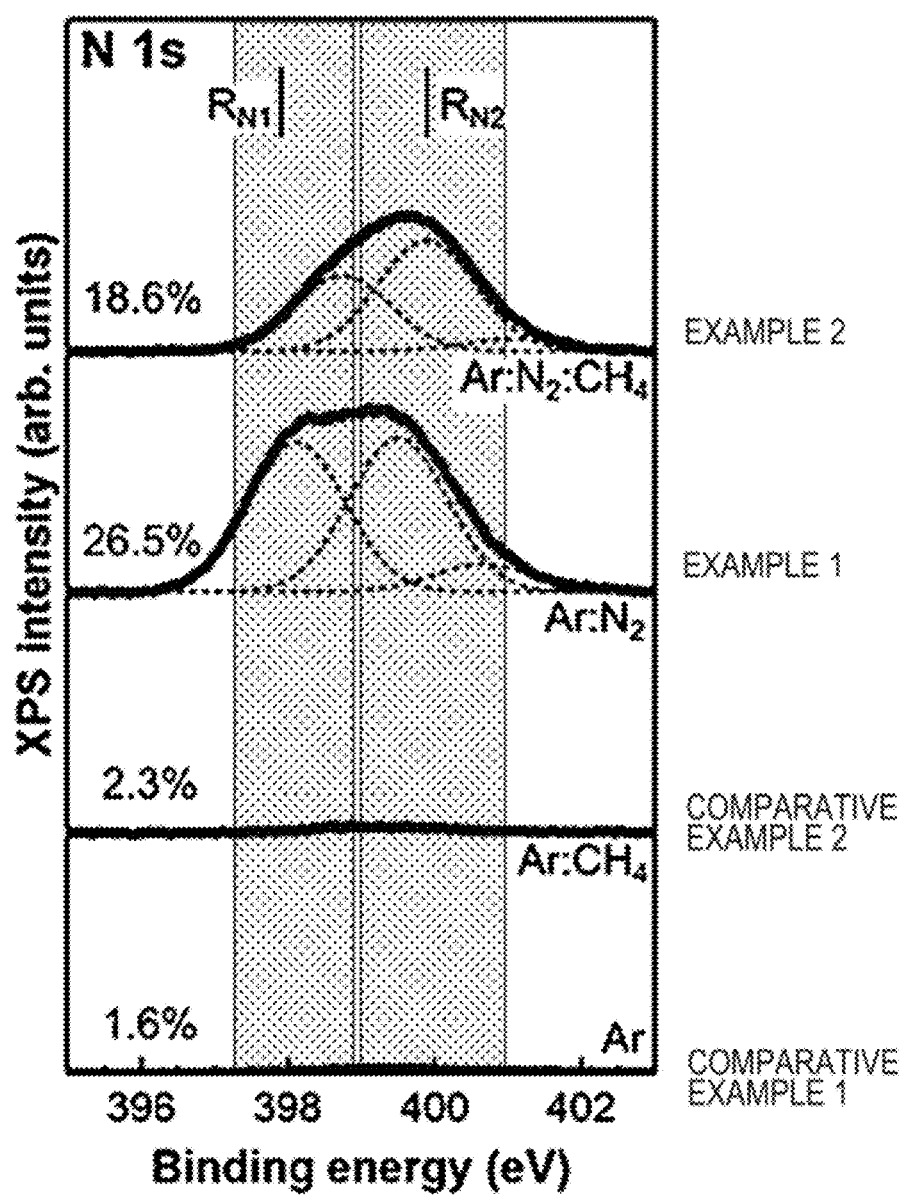
FIG. 29 is a graph showing a result of XPS for the carbon membranes in respective EXAMPLES and COMPARATIVE EXAMPLES (N1s)
Figure 30:
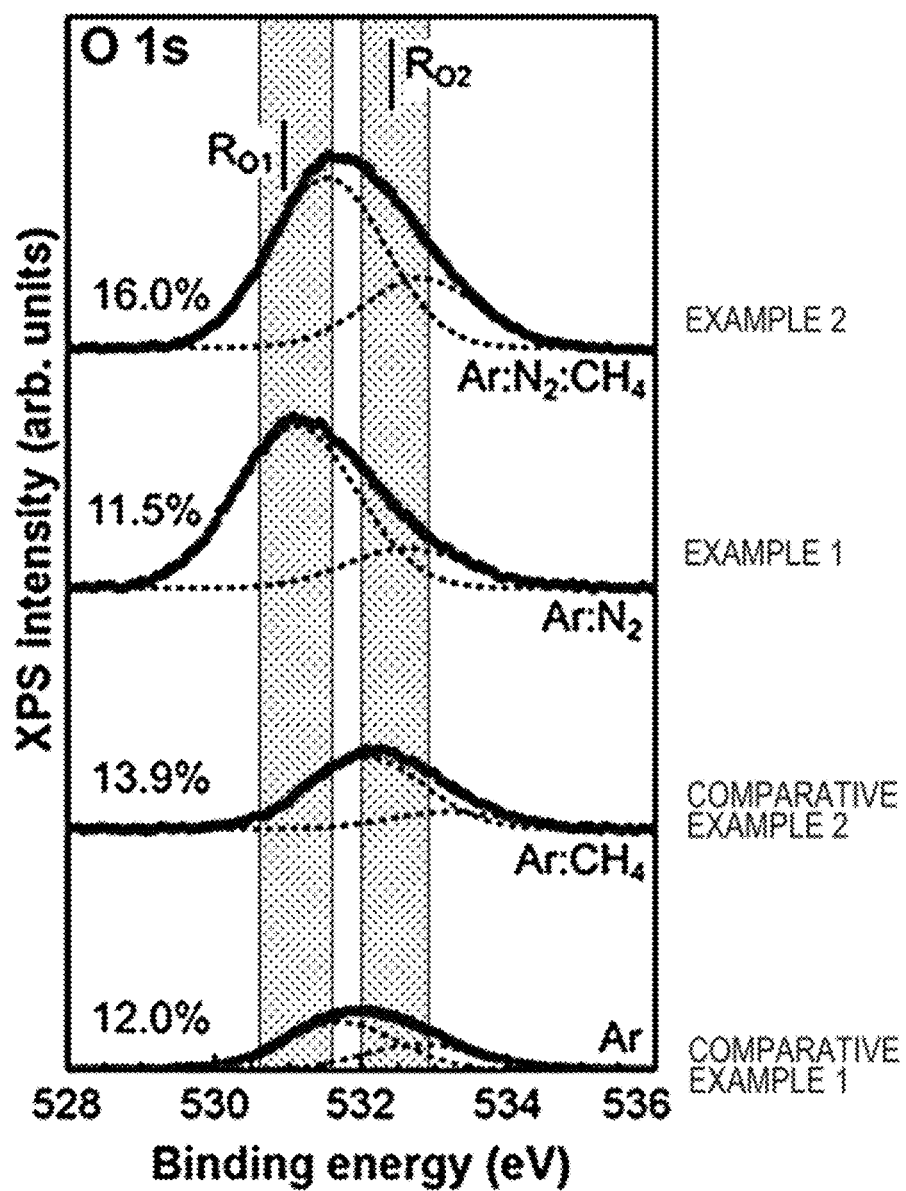
FIG. 30 is a graph showing a result of XPS for the carbon membranes in respective EXAMPLES and COMPARATIVE EXAMPLES (O1s)
Figure 31:
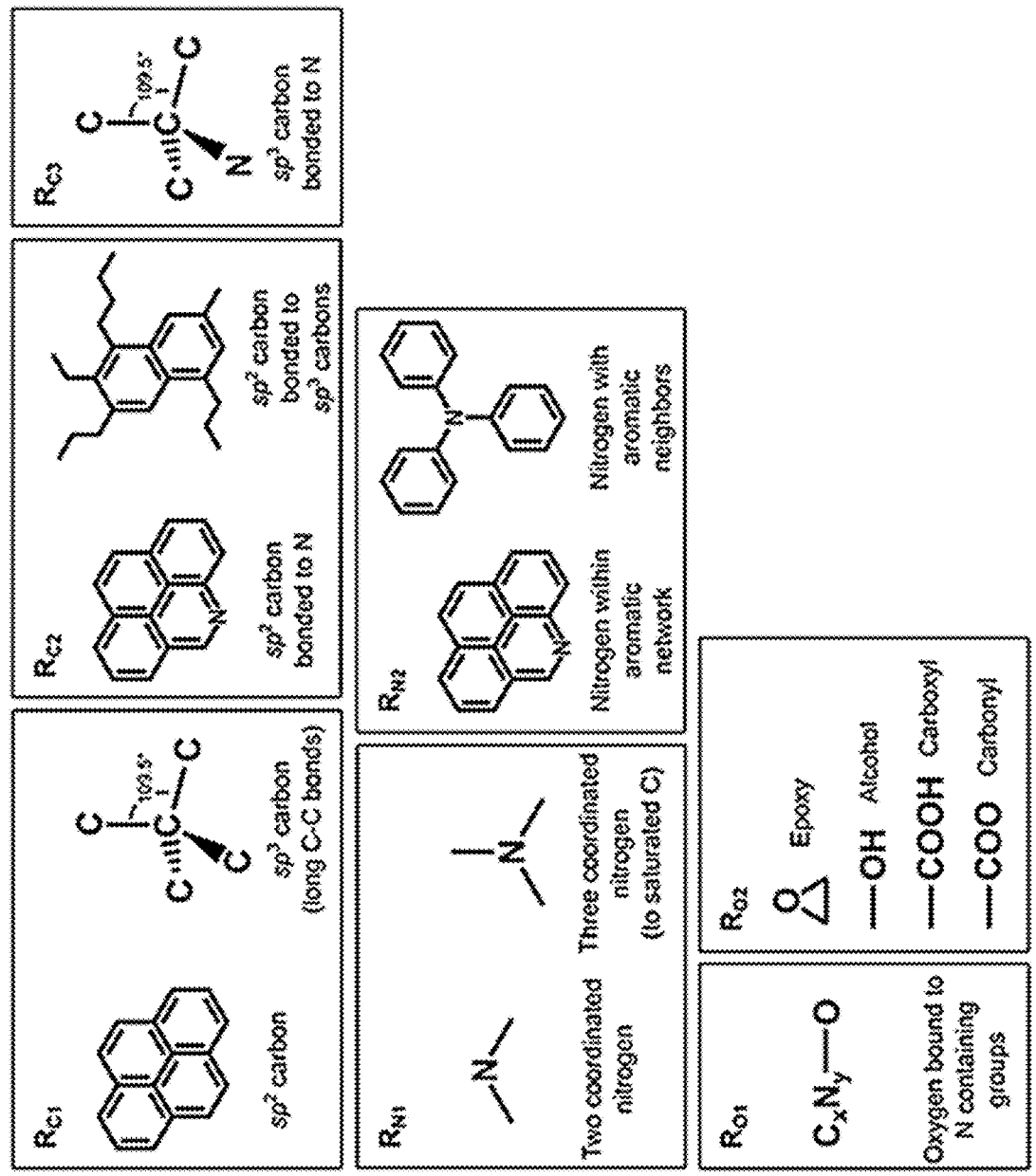
FIG. 31 is an illustration showing model chemical structures corresponding to the respective regions in C1s, N1s, and O1s for the XPS spectra.

As to the reverse osmosis membranes of EXAMPLES 1 and 2 and the comparative membranes of COMPARATIVE EXAMPLES 1 and 2, the substances (C1s, N1s, O1s) composing the respective membranes were examined using an X-ray photoelectron spectroscopy (XPS). The results of XPS for the respective membranes are shown in FIGS. 28 (C1s), 29 (N1s), and 30 (O1s). FIG. 31 is an illustration showing model chemical structures corresponding to the respective regions in C1s, N1s, and O1s for the XPS spectra.

<XPS Analysis (Survey Spectrum)>

Figure 32:
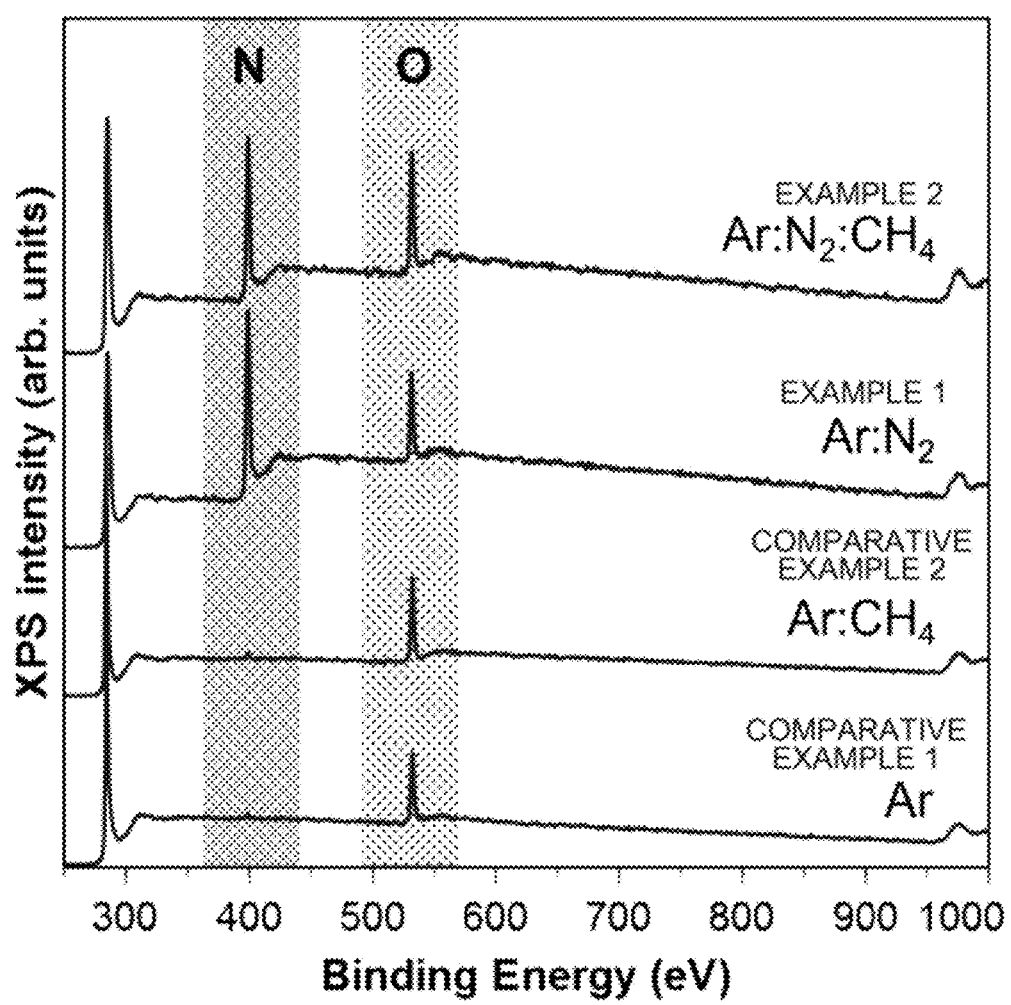
FIG. 32 is a graph showing a result of XPS (survey spectrum) for the carbon membranes of respective EXAMPLES and COMPARATIVE EXAMPLES.

In addition, as to each carbon membrane of EXAMPLES 1 and 2 and COMPARATIVE EXAMPLES 1 and 2, a result of survey spectra by XPS is shown in FIG. 32. In addition, the element-containing percentage (atm %) in each carbon membrane of EXAMPLES 1 and 2 and COMPARATIVE EXAMPLES 1 and 2 calculated by the survey spectra is shown in Table 1.

TABLE 1

| | PROCESS GAS | C (atm %) | N (atm %) | O (atm %) |
|---|---|---|---|---|
| EXAMPLE 2 | Ar, $N_2$, $CH_4$ | 65 | 19 | 16 |
| EXAMPLE 1 | Ar, $N_2$ | 62 | 27 | 11 |
| COMPARATIVE EXAMPLE 2 | Ar, $CH_4$ | 84 | 2 | 14 |
| COMPARATIVE EXAMPLE 1 | Ar | 86 | 2 | 12 |

As shown in FIG. 32 and Table 1, it is confirmed that adding $N_2$ as the process gas during membrane formation allowed the nitrogen to be taken in the carbon membrane, so that the amount of nitrogen in the carbon membrane increased. Herein, oxygen atoms in the carbon membrane are derived from atmospheric oxygen, moisture, and the like.

<Contact Angle>

Figure 35:
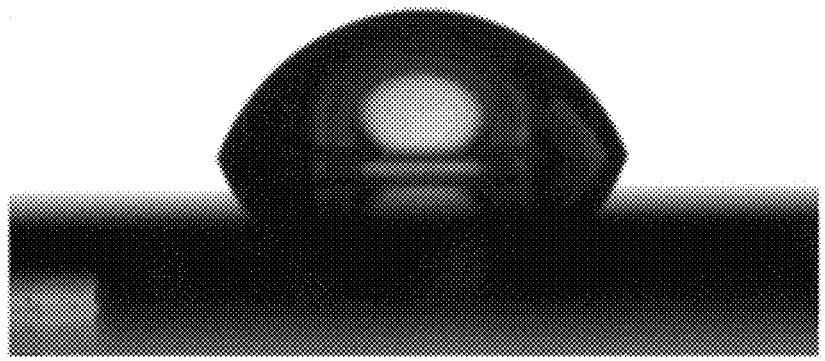
FIG. 35 is a view showing a result of contact angle on the carbon membrane of COMPARATIVE EXAMPLE 1.
Figure 36:
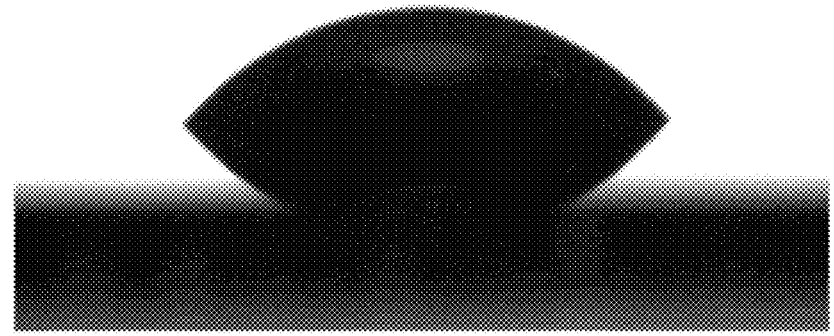
FIG. 36 is a view showing a result of contact angle on the carbon membrane of COMPARATIVE EXAMPLE 2.
Figure 37:
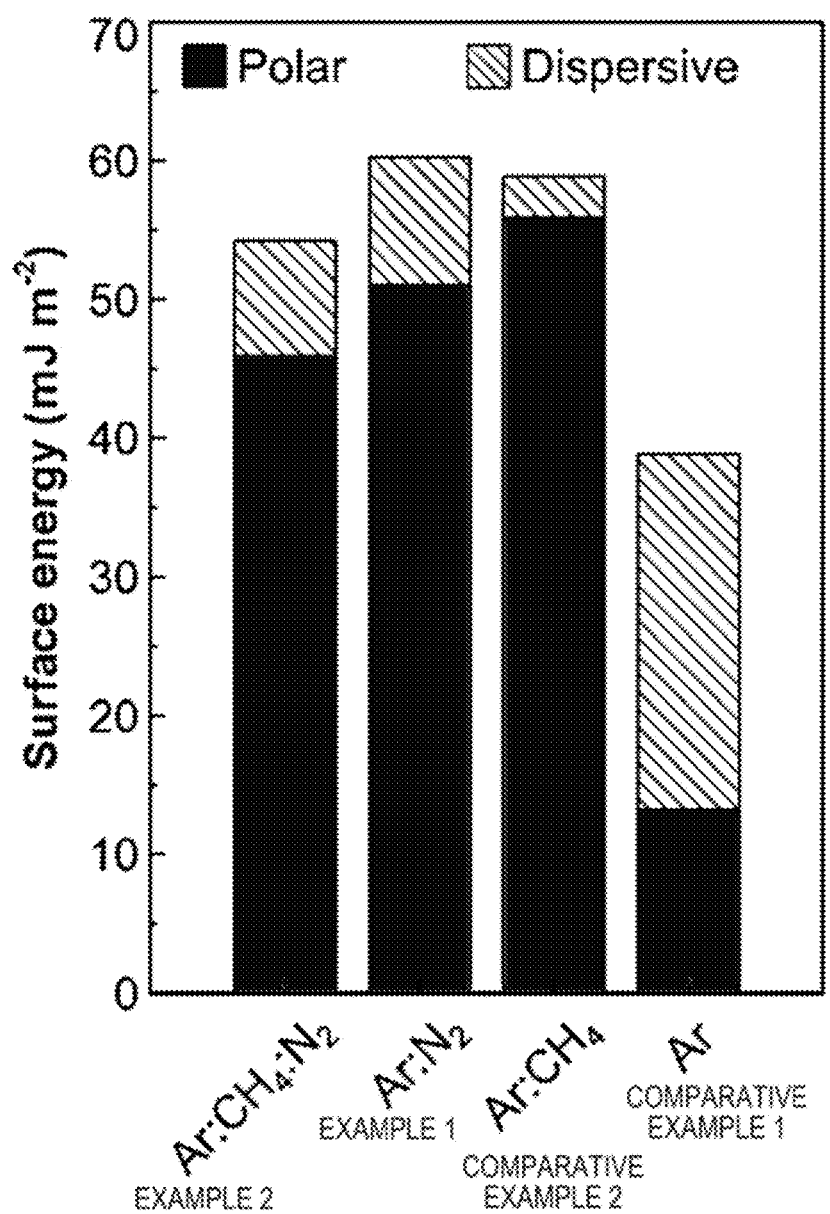
FIG. 37 is a view showing surface energy calculated from the contact angle on each carbon membrane of EXAMPLES 1 and 2 and COMPARATIVE EXAMPLES 1 and 2.

The contact angle of each carbon membrane of EXAMPLES 1 and 2 and COMPARATIVE EXAMPLES 1 and 2 with respect to water was measured to evaluate the hydrophilicity of each carbon membrane. Furthermore, based on the contact angle, important parameters such as surface energy were determined. The contact angle is a contact angle of the carbon membrane mounted on a silicon wafer with respect to water measured by a usual method. The results of EXAMPLES 1 and 2 and COMPARATIVE EXAMPLES 1 and 2 are shown in FIGS. 33 to 36. In addition, FIG. 37 shows the corresponding surface energy calculated from the measurement results using water and ethylene glycol.

As shown in FIGS. 33 and 34, the contact angle of EXAMPLE 1 was 38.1°, and the contact angle of EXAMPLE 2 was 45.8°. In addition, as shown in FIGS. 35 and 36, the contact angle of COMPARATIVE EXAMPLE 1 was 68.8°, and the contact angle of COMPARATIVE EXAMPLE 2 was 46.9°. In other words, it is confirmed that using Ar gas in conjunction with methane gas, nitrogen gas or a mixture thereof as the process gas improved the hydrophilicity of carbon membrane, in comparison with COMPARATIVE EXAMPLE 1 in which only Ar gas was used.

The surface energy is expressed as a sum of two components of the polar component and dispersion component. The dispersion component is related with a nonpolar group, which contributes to relatively higher hydrophobicity of the carbon film sputtered using only argon gas. Interestingly, it is confirmed that adding methane or nitrogen gas in a mixed gas for sputtering not only increased the surface energy as a whole (in particular, its polar component), but also effectively lowered the contact angle with respect to water (made the surface more hydrophilic).

Herein, the surface energy of each carbon membrane was calculated using the Young's formula which is a general approach for providing the polar component and dispersion component of the surface energy, based on the measurement result of the contact angle and surface tension in terms of two kinds of liquids (water and ethylene glycol).

<ATR-FTIR>

As to each carbon membrane of EXAMPLES 1 and 2 and COMPARATIVE EXAMPLES 1 and 2, infrared absorption spectra were measured using a Fourier transform infrared spectrophotometer (total reflection method). The measurement result is shown in FIG. 38.

Figure 38:
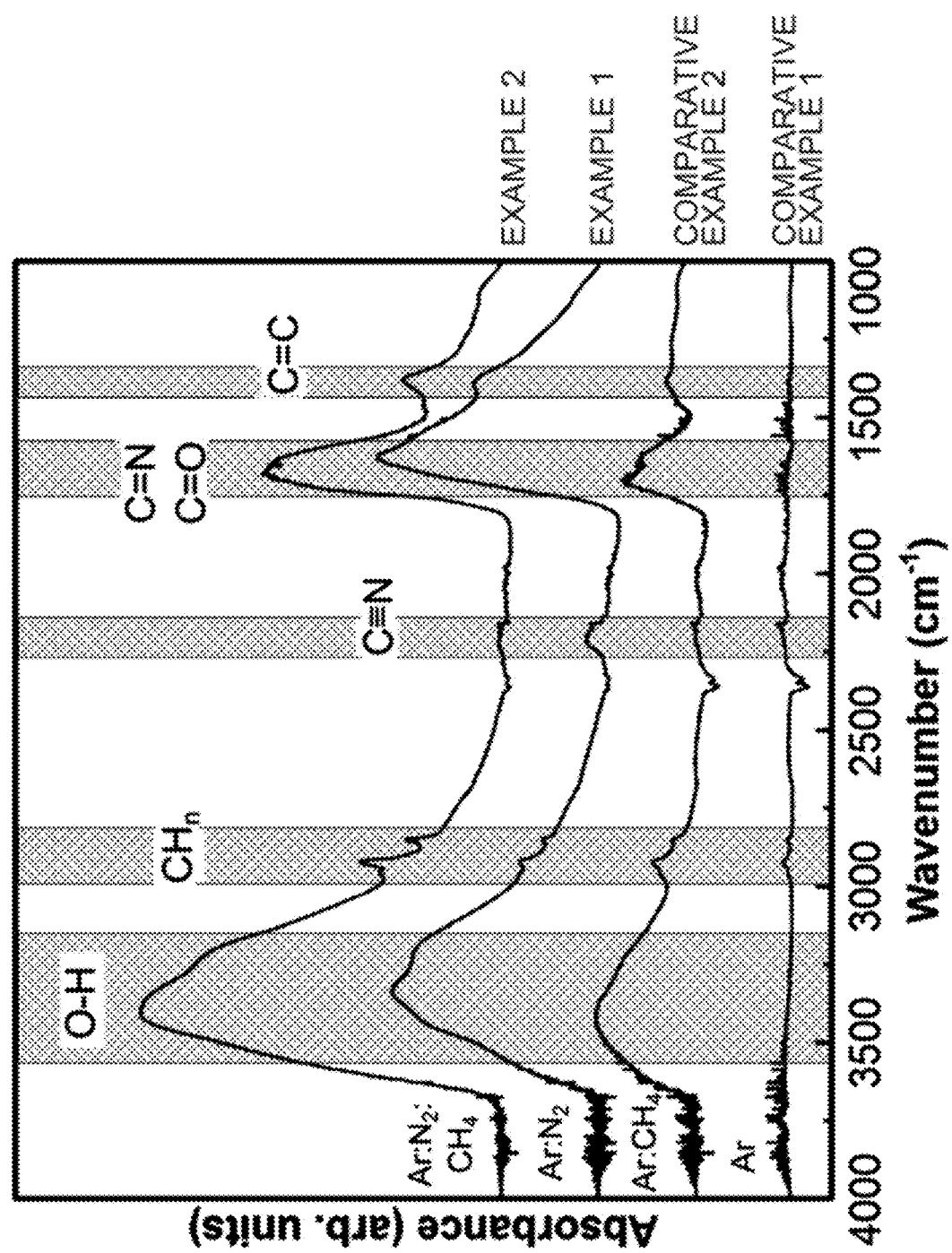
FIG. 38 is a graph showing infrared absorption spectra for the carbon membranes of respective EXAMPLES and COMPARATIVE EXAMPLES.

ATR-FTIR analysis clarifies an important difference in the presence of functional groups in the structure of the carbon membrane (carbon-based nanostructure film), as recognized from the spectra shown in FIG. 38. The carbon membrane (COMPARATIVE EXAMPLE 1) in which only argon was used as a sputtering gas had few functional groups, as was expected that only a nanosize graphite-like cluster would compose the carbon layer. In contrast, in the carbon membranes in which a mixed gas (Ar:$CH_4$, Ar:$N_2$, and Ar:$N_2$:$CH_4$) was used as a sputtering gas, various functional groups were observed, as recognized from the spectra shown in FIG. 38.

<Raman Spectrometric Analysis>

The Raman spectrometric analysis was performed for each carbon membrane of EXAMPLES 1 and 2 and COMPARATIVE EXAMPLES 1 and 2. Herein, the wavelength of a laser (green laser) used was 532 nm. The results are shown in FIGS. 39 to 41.

Figure 39:
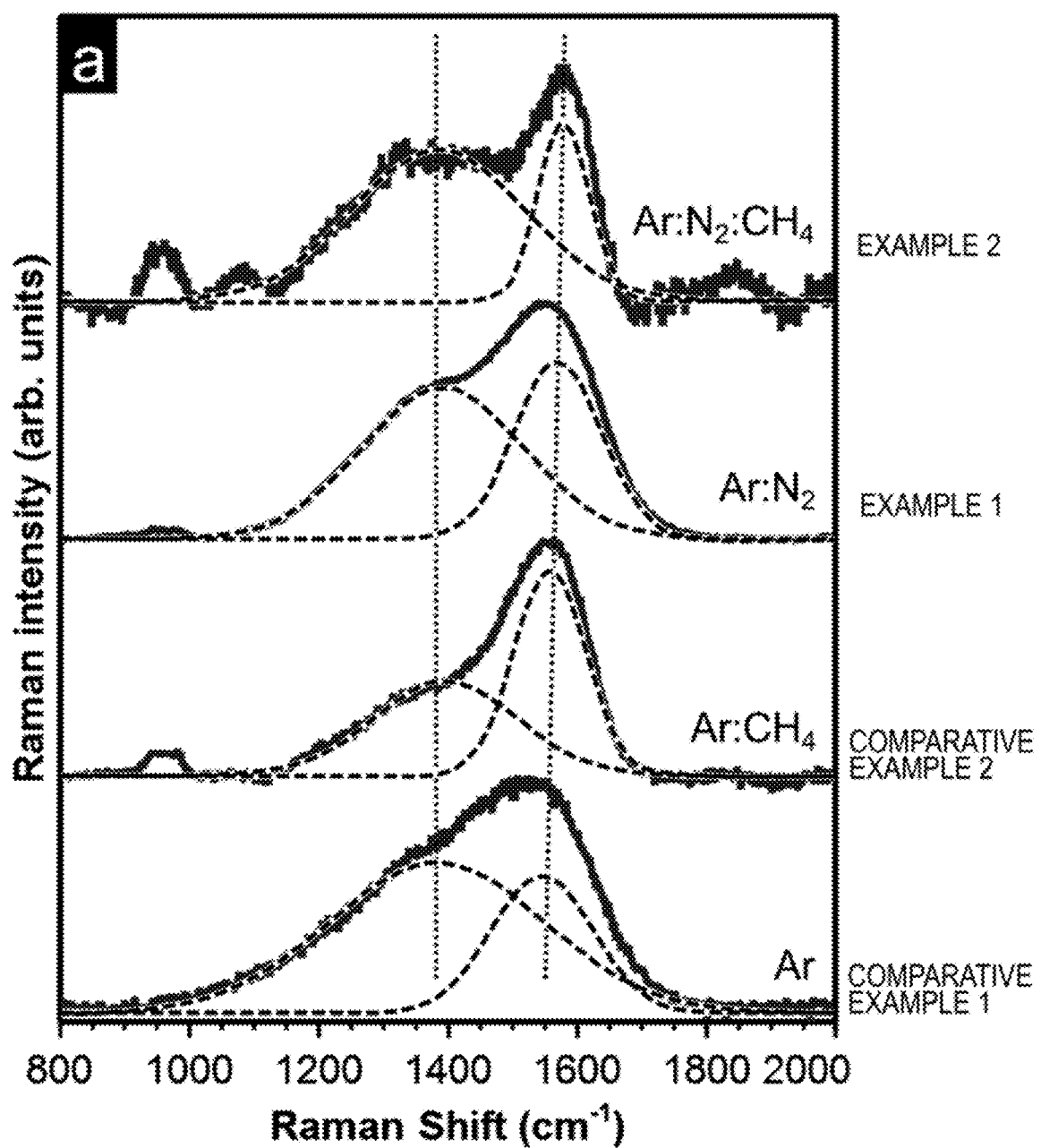
FIG. 39 is a graph showing a result of Raman spectrometric analysis for the carbon membranes of respective EXAMPLES and COMPARATIVE EXAMPLES.
Figure 40:
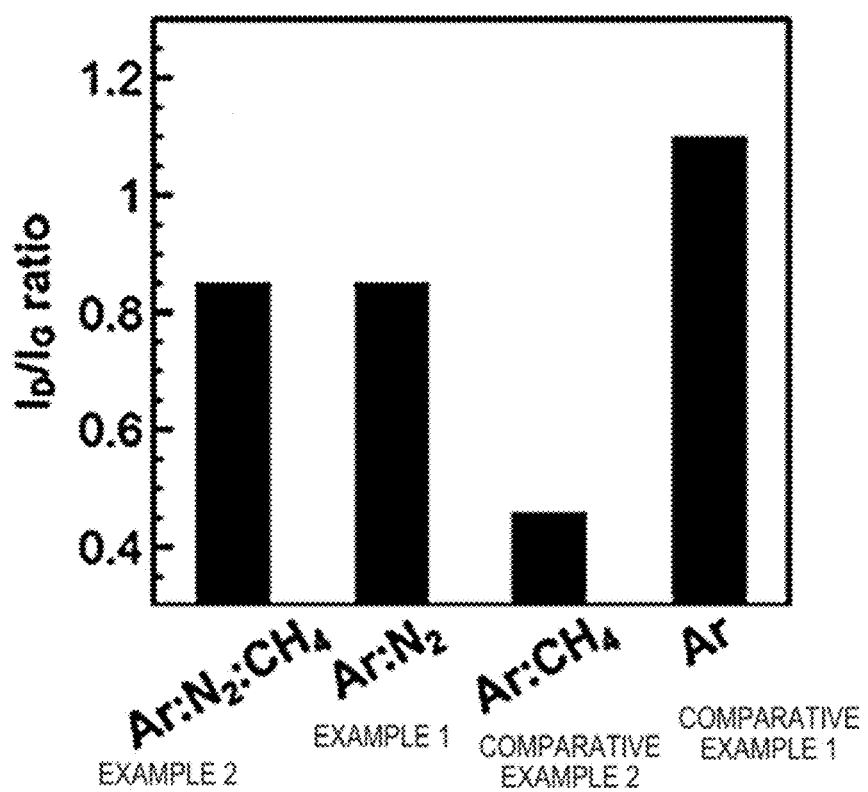
FIG. 40 is a graph showing a result of Raman spectrometric analysis (intensity ratio between D band and G band) for the carbon membranes of respective EXAMPLES and COMPARATIVE EXAMPLES.
Figure 41:
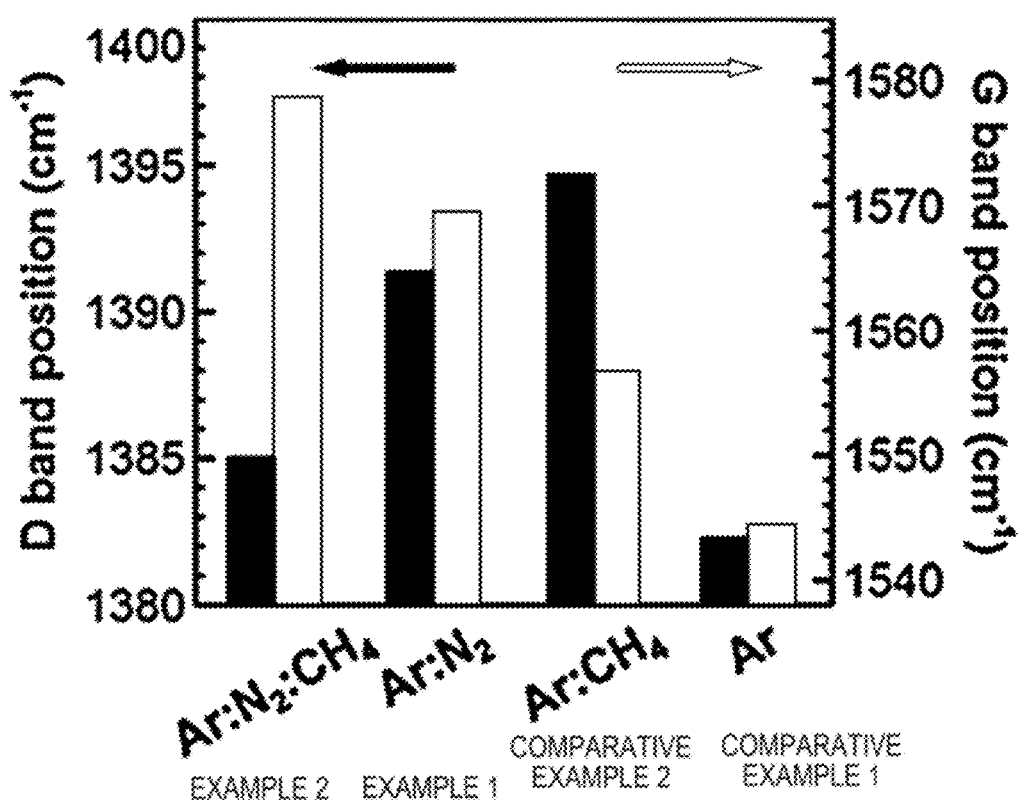
FIG. 41 is a graph showing a result of Raman spectrometric analysis (D band and G band) for the carbon membranes of respective EXAMPLES and COMPARATIVE EXAMPLES.

As shown in FIGS. 39 to 41, D band (1350 cm$^{-1}$) and G band (1550 cm$^{-1}$) can be identified, suggesting that each carbon membrane of EXAMPLES 1 and 2 possesses the feature of so-called diamond-like carbon.

<Evaluation 1 of Water Permeation and Salt Rejection>

Figure 42:
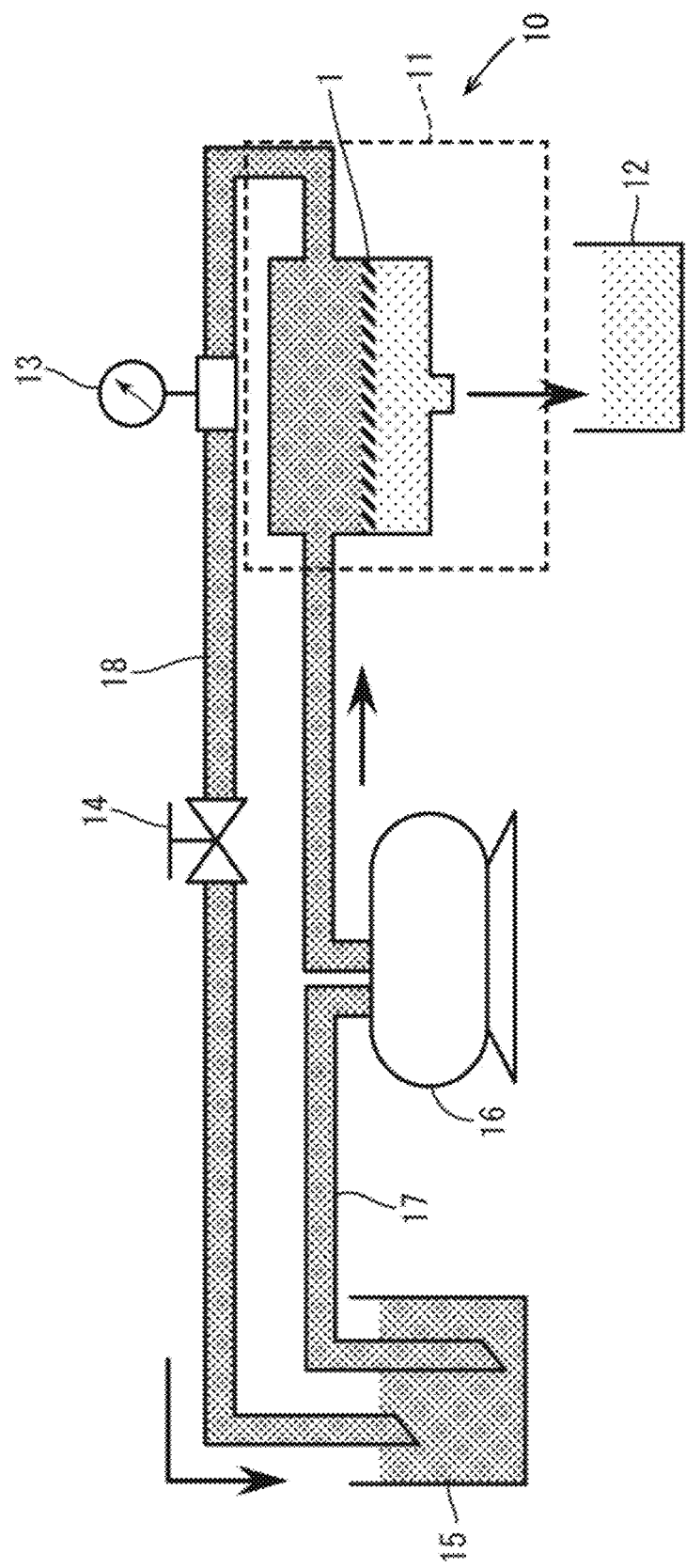
FIG. 42 is a schematic view of a test device of a cross-flow filtration system.

As to the reverse osmosis membranes of EXAMPLES 1 and 2 and the comparative membranes of COMPARATIVE EXAMPLES 1 and 2, a filtration test was carried out using a test device of a cross-flow filtration system as shown in FIG. 42. In evaluation of water permeation and salt rejection, as test samples of the reverse osmosis membranes of EXAMPLES 1 and 2 and the comparative membranes of COMPARATIVE EXAMPLES 1 and 2, circle-shaped ones having a diameter of 25 mm were used. First of all, a description is made of the test device with reference to FIG. 42.

FIG. 42 is a schematic view of a test device 10 of a cross-flow filtration system. The test device 10 includes a filtrating unit 11, a filtrate collecting container 12, a pressure gauge 13, a valve 14, a collecting container 15, a pump 16, an upstream side pipe 17, and a downstream side pipe 18.

The filtrating unit 11 holds the test samples such as the reverse osmosis membrane 1 such that a solution targeted for filtration (salt water) flows along the surface (carbon membrane) of the test sample (e.g., the reverse osmosis membrane 1), while filtering the solution targeted for filtration on the way of the flow using the test samples. The filtrate collecting container 12 is a container 12 for collecting a liquid which has permeated the test sample (permeate solution).

To the filtrating unit 11, the solution targeted for filtration (salt water) contained in the collecting container 15 is supplied through the upstream side pipe 17. The filtrating unit 11 and the collecting container 15 are connected to each other by the upstream side pipe 17. In addition, on the way of the upstream side pipe 17, the pump 16 is provided to send to the filtrating unit 11 the solution targeted for filtration. Furthermore, the filtrating unit 11 and the collecting container 15 are connected to each other by the downstream side pipe 18, through which the discharged solution targeted for filtration (salt water) from the filtrating unit 11 will be returned to the collecting container 15. On the way of the downstream side pipe 18, the pressure gauge 13 and the valve 14 are provided, in which the flow rate of the solution targeted for filtration circulating the downstream side pipe 18 and the like is adjusted by opening/closing the valve 14.

By such test device 10, evaluation of water permeation and salt rejection for each membrane (test sample) of EXAMPLES and COMPARATIVE EXAMPLES was carried out using sodium chloride aqueous solutions (the concentration: 0.2% by weight, and the concentration: 3.5% by weight) as the liquids targeted for filtration, In order to stabilize the permeate flux rate in the test device 10, pure water was preliminarily circulated at supplying pressures of 3 MPa to 5 MPa. Subsequently, each of the sodium chloride aqueous solutions (the concentration: 0.2% by weight, and the concentration: 3.5% by weight) as the liquids targeted for filtration was supplied in the test device 10 to be filtered. Supplying pressures of sodium chloride aqueous solutions were adjusted to be 1 MPa to 5 MPa.

The amount of permeate water (permeate flux) through the test sample is calculated by formula (1) as represented below.

$$F=L/ST \quad (1)$$

In above-mentioned formula (1), F is a permeate flux (Lm$^{-2}$ h$^{-1}$), L is an amount of permeate water (L), S is an effective membrane area of the test sample (m$^2$), and T is a test time (h).

In addition, the salt rejection rate (%) by the test sample is calculated by formula (2) as represented below.

$$R=(1-C2/C1)\times 100(\%) \quad (2)$$

In above-mentioned formula (2), R is a salt rejection rate (%), C1 is an NaCl concentration in the original solution (solution targeted for filtration), and C2 is an NaCl concentration in the liquid which has permeated the test sample (permeate water).

Figure 43:
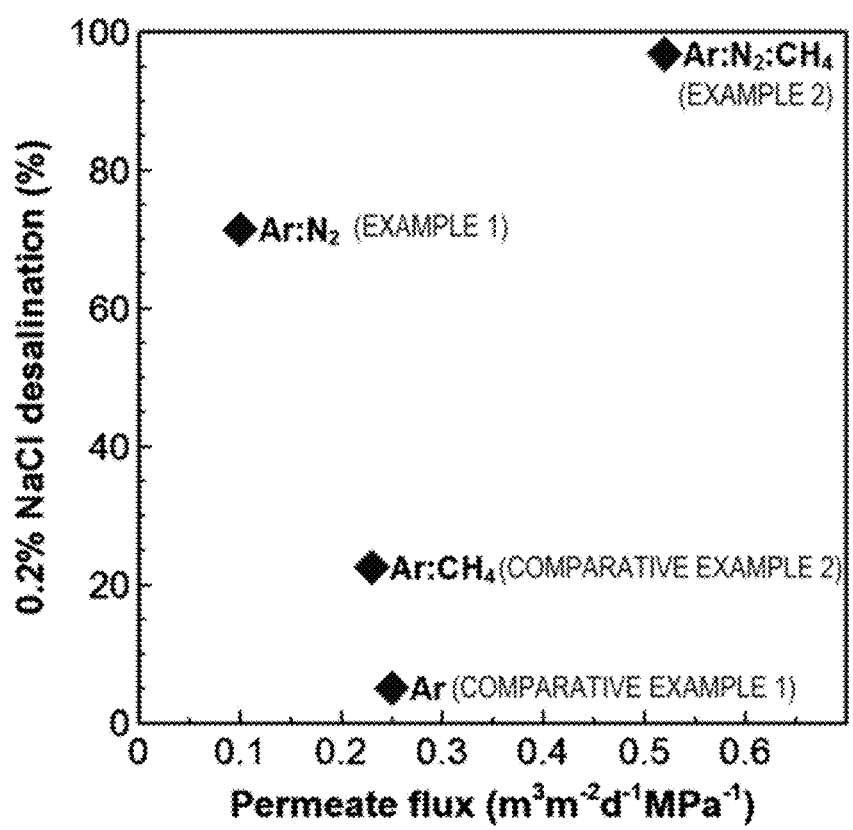
FIG. 43 is a graph showing an evaluation result of water permeation and salt rejection in each membrane of EXAMPLES and COMPARATIVE EXAMPLES.

The evaluation result of water permeation and salt rejection is shown as a graph in FIG. 43. As shown in FIG. 43, the salt rejection rate by the reverse osmosis membrane of EXAMPLE 1 was 70% or more, from which it is confirmed that the reverse osmosis membrane of EXAMPLE 1 has excellent salt rejection performance. In particular, the salt rejection by the reverse osmosis membrane of EXAMPLE 2 was up to 96.8%, from which it is confirmed that the reverse osmosis membrane of EXAMPLE 2 has excellent salt rejection performance. In contrast, the salt rejection by each comparative membrane of COMPARATIVE EXAMPLES 1 and 2 was low, from which it is confirmed that the comparative membranes of COMPARATIVE EXAMPLES 1 and 2 have remarkably poor salt rejection performance.

<Evaluation 2 of Water Permeation and Salt Rejection (Difference of Membrane Thickness)>

Figure 44:
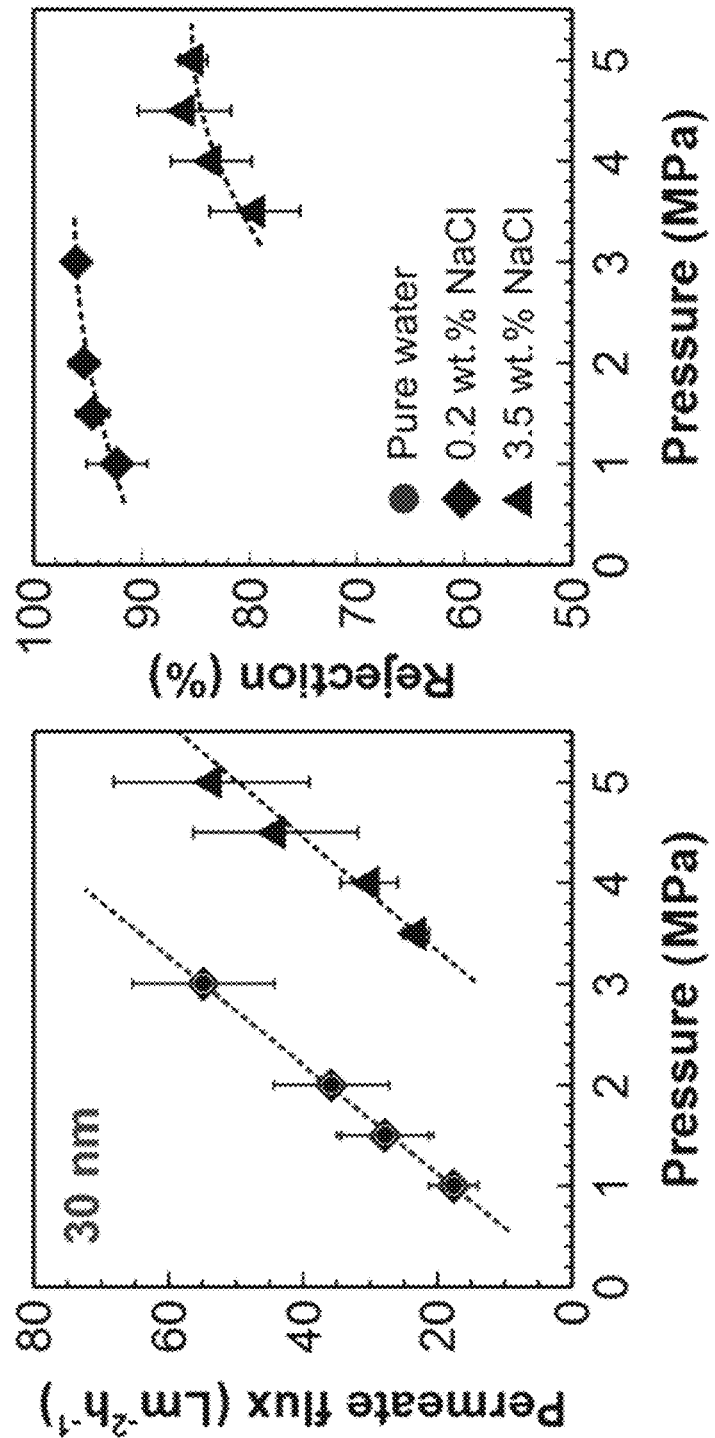
FIG. 44 is graphs showing a relationship of the pressure with the flux and a relationship of the pressure with the salt rejection rate when solutions targeted for filtration having different concentrations (0.2% by weight sodium chloride aqueous solution, and 3.5% by weight sodium chloride aqueous solution) were filtered through the reverse osmosis membrane of EXAMPLE 2 (the thickness of carbon membrane: approximately 30 nm (30±2 nm))
Figure 45:
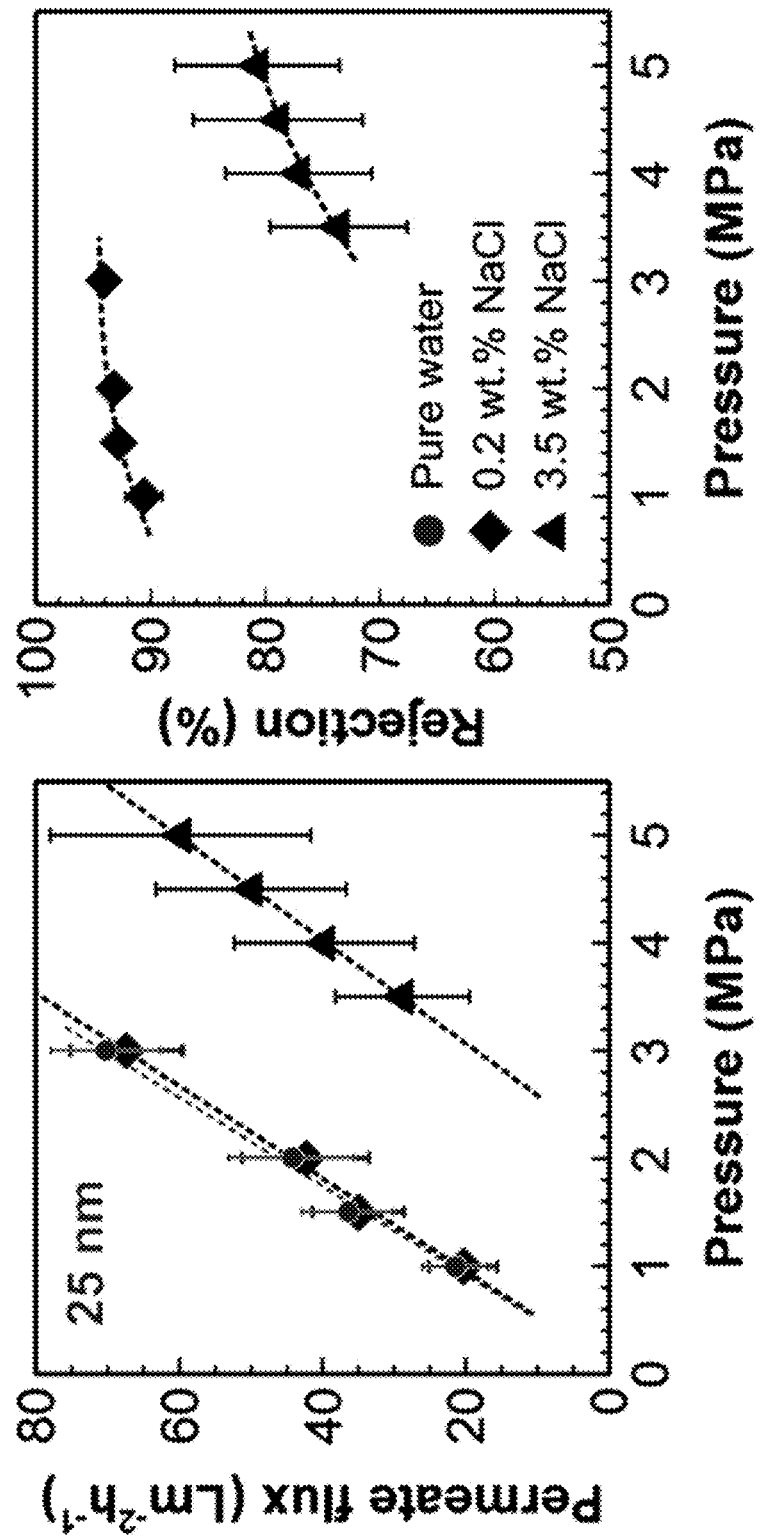
FIG. 45 is graphs showing a relationship of the pressure with the flux and a relationship of the pressure with the salt rejection rate when solutions targeted for filtration having different concentrations (0.2% by weight sodium chloride aqueous solution, and 3.5% by weight sodium chloride aqueous solution) were filtered through the reverse osmosis membrane of EXAMPLE 3 (the thickness of carbon membrane: approximately 25 nm (25±2 nm))

Next, a consideration is made of the reverse osmosis membrane of EXAMPLE 2 and the reverse osmosis membrane of EXAMPLE 3, whose carbon membranes are different in thickness from each other. FIG. 44 is graphs showing a relationship of the pressure with the flux and a relationship of the pressure with the salt rejection rate when solutions targeted for filtration having different concentrations (0.2% by weight sodium chloride aqueous solution, and 3.5% by weight sodium chloride aqueous solution) were filtered through the reverse osmosis membrane of EXAMPLE 2 (the thickness of carbon membrane: approximately 30 nm (30±2 nm)). FIG. 45 is graphs showing a relationship of the pressure with the flux and a relationship of the pressure with the salt rejection rate when solutions targeted for filtration having different concentrations (0.2% by weight sodium chloride aqueous solution, and 3.5% by weight sodium chloride aqueous solution) were filtered through the reverse osmosis membrane of EXAMPLE 3 (the thickness of carbon membrane: approximately 25 nm (25±2 nm)).

As shown in FIGS. 44 and 45, in any case where the liquid targeted for filtration was pure water, 0.2% by weight sodium chloride aqueous solution, or 3.5% sodium chloride aqueous solution, it is confirmed that the flux under the predetermined pressure became lower through the carbon membrane of EXAMPLE 2 having large thickness, in comparison with the carbon membrane of EXAMPLE 3 having small thickness.

In addition, as shown in FIGS. 44 and 45, in either case where the liquid targeted for filtration was 0.2% by weight sodium chloride aqueous solution, or the liquid was 3.5% sodium chloride aqueous solution, it is confirmed that the salt rejection rate (%) under the predetermined pressure became higher through the carbon membrane of EXAMPLE 2 having large thickness, in comparison with the carbon membrane of EXAMPLE 3 having small thickness.

It is confirmed that the reverse osmosis membranes of EXAMPLES 1 to 3 possessed intensity and flexibility sufficient to tolerate the above-mentioned water permeation and salt rejection tests.

<Evaluation of Chlorine Resistance>

Evaluation of chlorine resistance for the reverse osmosis membrane of EXAMPLE 2 as mentioned above and each reverse osmosis membrane of EXAMPLES 4 to 6 as mentioned below was performed. Each reverse osmosis membrane of EXAMPLES 4 to 6 was produced according to a method as mentioned below.

Example 4

In the same manner as EXAMPLE 2, except that, among membrane formation conditions for forming a carbon membrane, the condition of the process gas was modified such that the supplying concentration of nitrogen gas ($N_2$) was changed to 19%, a reverse osmosis membrane of EXAMPLE 4 (the thickness of carbon membrane: approximately 30 nm (30±2 nm)) was formed.

Example 5

In the same manner as EXAMPLE 2, except that, among membrane formation conditions for forming a carbon membrane, the condition of the process gas was modified such that the supplying concentration of nitrogen gas ($N_2$) was changed to 16%, a reverse osmosis membrane of EXAMPLE 5 (the thickness of carbon membrane: approximately 30 nm (30±2 nm)) was formed.

Example 6

In the same manner as EXAMPLE 2, except that, among membrane formation conditions for forming a carbon membrane, the condition of the process gas was modified such that the supplying concentration of nitrogen gas ($N_2$) was changed to 9%, a reverse osmosis membrane of EXAMPLE 6 (the thickness of carbon membrane: approximately 30 nm (30±2 nm)) was formed.

<Evaluation 3 of Water Permeation and Salt Rejection>

As to each reverse osmosis membrane of EXAMPLE 2 and EXAMPLES 4 to 6, a filtration test was carried out using a test device of a cross-flow filtration system, in the same manner as <Evaluation 1 of water permeation and salt rejection> mentioned above. Herein, as the liquids targeted for filtration, sodium chloride aqueous solutions (the concentration: 0.2% by weight, and the concentration: 3.5% by weight) were used in the same manner as <Evaluation 1 of water permeation and salt rejection> mentioned above. The supplying pressures of sodium chloride aqueous solution were adjusted to 3 MPa and 5 MPa in cases where the concentrations were 0.2% by weight and 0.35% by weight, respectively. The evaluation result of water permeation and salt rejection is shown as a graph in FIG. 46.

<NaClO Exposure Treatment>

Each reverse osmosis membrane of EXAMPLE 2 and EXAMPLES 4 to 6 was immersed in a sodium hypochlorite (NaClO) aqueous solution (200 ppm) for 24 hours. Subsequently, each reverse osmosis membrane was taken out of the aqueous solution and washed with purified water.

<Evaluation 4 of Water Permeation and Salt Rejection>

As to each reverse osmosis membrane of EXAMPLE 2 and EXAMPLES 4 to 6 which had undergone the NaClO exposure treatment as mentioned above, a filtration test was carried out in the same condition as <Evaluation 3 of water permeation and salt rejection> mentioned above. The evaluation result of water permeation and salt rejection is shown as a graph in FIG. 46.

Figure 46:
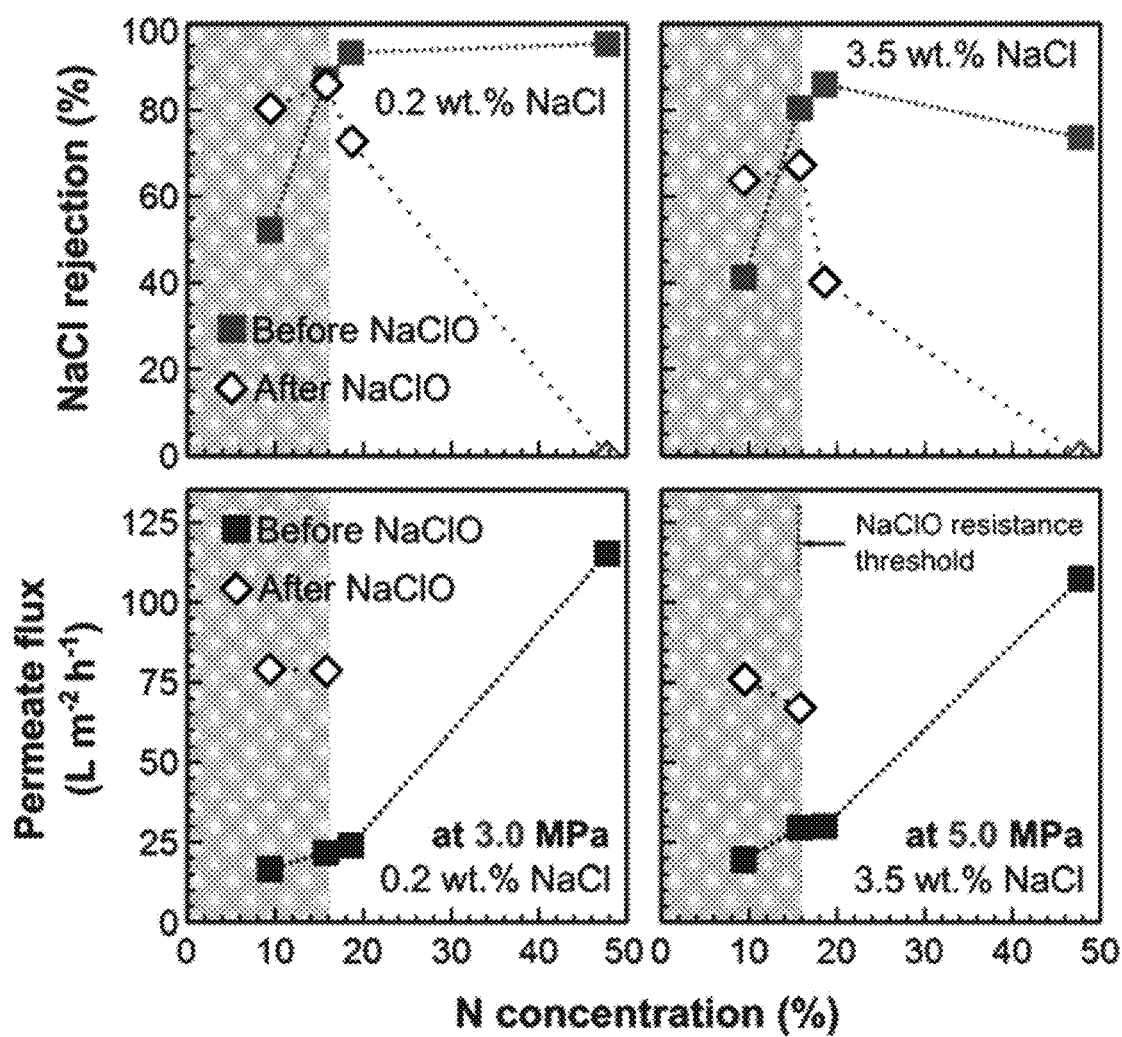
FIG. 46 is graphs showing relationships between the nitrogen concentration in the carbon membrane and the salt rejection rate before and after the NaClO exposure treatment; and relationships between the nitrogen concentration in the carbon membrane and the permeate flux before and after the NaClO exposure treatment.

The reverse osmosis membrane of EXAMPLE 5 was formed under a condition where the supplying concentration of nitrogen gas was set to be approximately 16%. It is confirmed that the reverse osmosis membrane of EXAMPLE 5 considerably inhibited degradation of the carbon membrane (carbon-based nanostructure film) caused by chlorine. As shown in FIG. 46, even after the membrane was exposed to chlorine in the NaClO exposure treatment, the salt rejection rate for 0.2% by mass sodium chloride aqueous solution was 86%, and the salt rejection rate for 3.5% by mass sodium chloride aqueous solution was 67%. As shown in FIG. 46, it is confirmed that when the supplying concentration of nitrogen gas was approximately 16% or less, the salt rejection ability of the reverse osmosis membrane (carbon membrane) was maintained.

<Simulation Using Amorphous Carbon>

Figure 47:
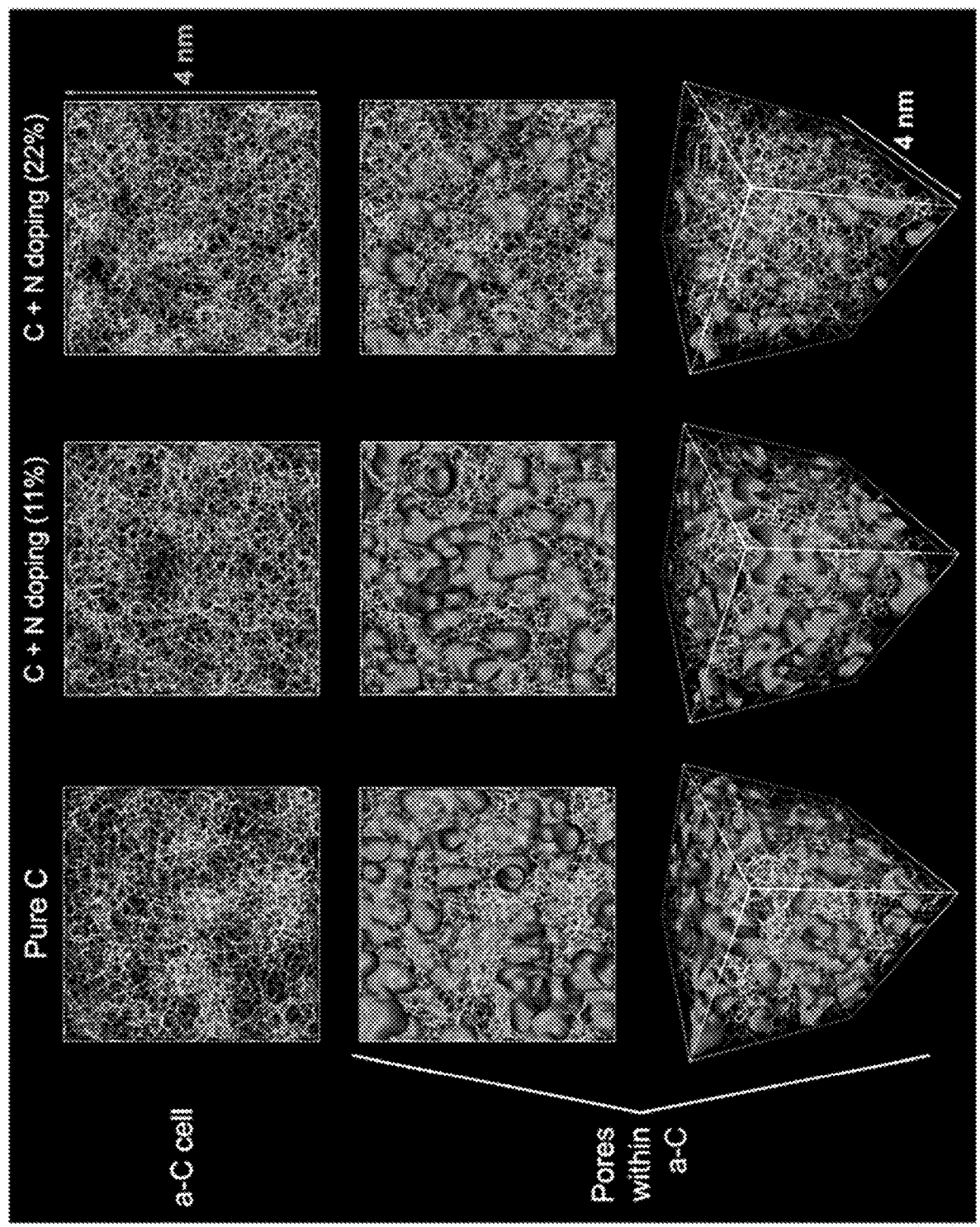
FIG. 47 is an illustration showing a simulation result in three kinds of molecular models of amorphous carbon alone, amorphous carbon containing 11% nitrogen, and amorphous carbon containing 22% nitrogen.

Molecular models of three kinds of amorphous carbon were set and analyzed to describe the change caused by nitrogen in the nanostructure of amorphous carbon. These models consist of a) amorphous carbon alone, b) amorphous carbon containing 11% nitrogen, and c) amorphous carbon containing 22% nitrogen. Shown in FIG. 47 is each model after molecular relaxation using a molecular dynamic approach taking Tersoff potential and simulated annealing simulation for structural change into consideration.

In order to visualize pore density and flow channel formation under the effect of contained nitrogen, voids are shown within the surface. Ratios of the free volume to the total volume were calculated to be 0.46, 0.37, and 0.30, in cases of amorphous carbon alone, amorphous carbon containing 11% nitrogen, and amorphous carbon containing 22% nitrogen, respectively. The void spaces within the amorphous carbon structure were not the factor directly correlated with the water permeation capability, because the non-polar nature of pores within the pure carbon structure may affect passage or adsorption of charge particles, and thus prevent passage of water molecules. This would be understood, because a pure carbon membrane exhibits lower permeate flux in comparison with non-polar organic molecules permeation in the experiments here and in other prior arts.

The phenomenon illustrated by the simulation may correlate with the experimental structure analysis and water permeation capability. More detailed simulation taking hydrogen and oxygen into consideration can provide more accurate analysis result. We are now conducting more detailed analysis of salt rejection phenomenon from water.

EXPLANATION OF SYMBOLS

1: Reverse osmosis membrane
2: Porous support substrate
2A: Backing layer
2B: Porous plastic layer
3: Carbon membrane
10: Test device
11: Filtrating unit
12: Filtrate collecting container
13: Pressure gauge
14: Valve 15: Collecting container
16: Pump
17: Upstream side pipe
18: Downstream side pipe

The invention claimed is:

1. A method of forming a reverse osmosis membrane, comprising:
 a coating membrane forming step of forming a coating membrane which is soluble in a predetermined solvent on a surface of a porous support substrate that is insoluble in the solvent so as to block pores provided through the porous support substrate;
 a carbon membrane forming step of forming, on the coating membrane, by a physical vapor deposition that deposits carbon as a target material under an atmosphere where rare gas and nitrogen gas are contained and supplying concentration of the nitrogen gas is 9% or more, a carbon membrane which has a diamond-like-carbon structure containing a nitrogen atom and which is configured to be diffusely permeated with a particular material contained in a solution and to separate the particular material as an object targeted for removal; and
 a removing-by-dissolving step of, after formation of the carbon membrane, removing the coating membrane by immersing in the solvent a laminate formed of the porous support substrate, the coating membrane and the carbon membrane to dissolve the coating membrane in the solvent, thereby layering the carbon membrane on the porous support substrate.

2. The method of forming a reverse osmosis membrane according to claim 1, wherein the carbon membrane is formed under an atmosphere where hydrocarbon gas is further contained, in addition to the rare gas and the nitrogen gas, in the carbon membrane forming step.

3. The method of forming a reverse osmosis membrane according to claim 2, wherein the hydrocarbon gas consists of methane gas.

4. The method of forming a reverse osmosis membrane according to claim 3, wherein:
 the solvent consists of water and/or alcohol; and
 the coating membrane is removed by dissolving the same in the water and/or alcohol in the removing-by-dissolving step.

5. The method of forming a reverse osmosis membrane according to claim 4, wherein:
 the porous support substrate comprises a nonwoven fabric-type backing layer and a porous plastic layer provided on the backing layer; and
 the coating membrane is formed on the porous plastic layer of the porous support substrate in the coating membrane forming step.

6. The method of forming a reverse osmosis membrane according to claim 3, wherein:
 the porous support substrate comprises a nonwoven fabric-type backing layer and a porous plastic layer provided on the backing layer; and
 the coating membrane is formed on the porous plastic layer of the porous support substrate in the coating membrane forming step.

7. The method of forming a reverse osmosis membrane according to claim 2, wherein:
 the solvent consists of water and/or alcohol; and
 the coating membrane is removed by dissolving the same in the water and/or alcohol in the removing-by-dissolving step.

8. The method of forming a reverse osmosis membrane according to claim 7, wherein:
 the porous support substrate comprises a nonwoven fabric-type backing layer and a porous plastic layer provided on the backing layer; and
 the coating membrane is formed on the porous plastic layer of the porous support substrate in the coating membrane forming step.

9. The method of forming a reverse osmosis membrane according to claim 2, wherein:
 the porous support substrate comprises a nonwoven fabric-type backing layer and a porous plastic layer provided on the backing layer; and
 the coating membrane is formed on the porous plastic layer of the porous support substrate in the coating membrane forming step.

10. The method of forming a reverse osmosis membrane according to claim 1, wherein:
 the solvent consists of water and/or alcohol; and
 the coating membrane is removed by dissolving the same in the water and/or alcohol in the removing-by-dissolving step.

11. The method of forming a reverse osmosis membrane according to claim 10, wherein:
 the porous support substrate comprises a nonwoven fabric-type backing layer and a porous plastic layer provided on the backing layer; and
 the coating membrane is formed on the porous plastic layer of the porous support substrate in the coating membrane forming step.

12. The method of forming a reverse osmosis membrane according to claim 1, wherein:
 the porous support substrate comprises a nonwoven fabric-type backing layer and a porous plastic layer provided on the backing layer; and
 the coating membrane is formed on the porous plastic layer of the porous support substrate in the coating membrane forming step.

\* \* \* \* \*